United States Patent
Hosotani

(10) Patent No.: US 8,837,174 B2
(45) Date of Patent: Sep. 16, 2014

(54) SWITCHING POWER-SUPPLY APPARATUS INCLUDING SWITCHING ELEMENTS HAVING A LOW THRESHOLD VOLTAGE

(75) Inventor: Tatsuya Hosotani, Nagaokakyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 465 days.

(21) Appl. No.: 13/009,892

(22) Filed: Jan. 20, 2011

(65) Prior Publication Data

US 2011/0188269 A1 Aug. 4, 2011

(30) Foreign Application Priority Data

Jan. 29, 2010 (JP) ................................. 2010-018547

(51) Int. Cl.
*H02M 3/335* (2006.01)
*H02M 1/00* (2006.01)

(52) U.S. Cl.
CPC ............ *H02M 3/33592* (2013.01); *Y02B 70/16* (2013.01); *Y02B 70/1475* (2013.01); *H02M 3/33584* (2013.01); *H02M 2001/0032* (2013.01)
USPC ............................ 363/21.06; 363/21.1; 363/89

(58) Field of Classification Search
USPC ............................ 363/21.06, 21.1, 22, 89, 131
See application file for complete search history.

(56) References Cited

U.S. PATENT DOCUMENTS

| | | | |
|---|---|---|---|
| 4,857,822 A | 8/1989 | Tabisz et al. | |
| 4,953,068 A | 8/1990 | Henze | |
| 5,748,457 A * | 5/1998 | Poon et al. | 363/16 |
| 5,999,433 A | 12/1999 | Hua et al. | |
| 6,011,703 A | 1/2000 | Boylan et al. | |
| 6,064,580 A * | 5/2000 | Watanabe et al. | 363/17 |
| 6,414,861 B1 | 7/2002 | Matsumoto et al. | |
| 7,333,350 B2 * | 2/2008 | Williams et al. | 363/17 |
| 8,199,530 B2 * | 6/2012 | Sase et al. | 363/17 |
| 2003/0185021 A1 | 10/2003 | Huang et al. | |
| 2003/0218892 A1 | 11/2003 | Nakagawa | |
| 2006/0013022 A1 * | 1/2006 | Jitaru | 363/21.12 |
| 2006/0139969 A1 | 6/2006 | Tsuruya | |
| 2009/0284991 A1 * | 11/2009 | Nishikawa | 363/21.02 |
| 2010/0290256 A1 * | 11/2010 | Zhou et al. | 363/21.02 |
| 2010/0328967 A1 * | 12/2010 | Cody et al. | 363/21.02 |
| 2011/0205761 A1 * | 8/2011 | Tschirhart et al. | 363/21.02 |

FOREIGN PATENT DOCUMENTS

| | | |
|---|---|---|
| CN | 1447504 A | 10/2003 |
| CN | 101582643 A | 11/2009 |
| JP | 06-311743 A | 11/1994 |
| JP | 11-103573 A | 4/1999 |

(Continued)

OTHER PUBLICATIONS

Official Communication issued in corresponding European Patent Application No. 11151338.8, mailed on Dec. 29, 2011.

(Continued)

*Primary Examiner* — Jue Zhang
*Assistant Examiner* — Lakaisha Jackson
(74) *Attorney, Agent, or Firm* — Keating & Bennett, LLP

(57) ABSTRACT

In a switching power-supply apparatus, a primary-side power converter circuit includes a half bridge system and a synchronous rectifier circuit is provided as a rectifier circuit of a secondary-side power converter circuit. An on time ratio of the on time of a first switching element to the on time of a second switching element is controlled so as to provide an operation mode in which energy is regenerated from the secondary side to the primary side when the load is light.

16 Claims, 21 Drawing Sheets

(56) References Cited

FOREIGN PATENT DOCUMENTS

| | | |
|---|---|---|
| JP | 11-262263 A | 9/1999 |
| JP | 2002-315324 A | 10/2002 |
| JP | 2002-354799 A | 12/2002 |
| JP | 2003-189622 A | 7/2003 |
| JP | 2004-201482 A | 7/2004 |
| JP | 2009-171829 A | 7/2009 |
| JP | 2010-115049 A | 5/2010 |
| WO | 2010/010761 A1 | 1/2010 |

OTHER PUBLICATIONS

Official Communication issued in corresponding Chinese Patent Application No. 201010623057.9, mailed on May 23, 2014.

\* cited by examiner

FIG. 2
PRIOR ART
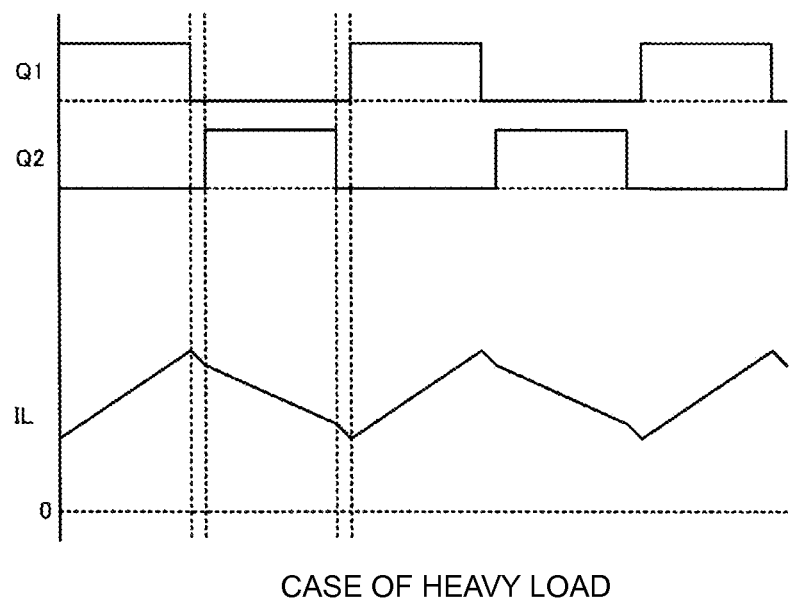
CASE OF HEAVY LOAD
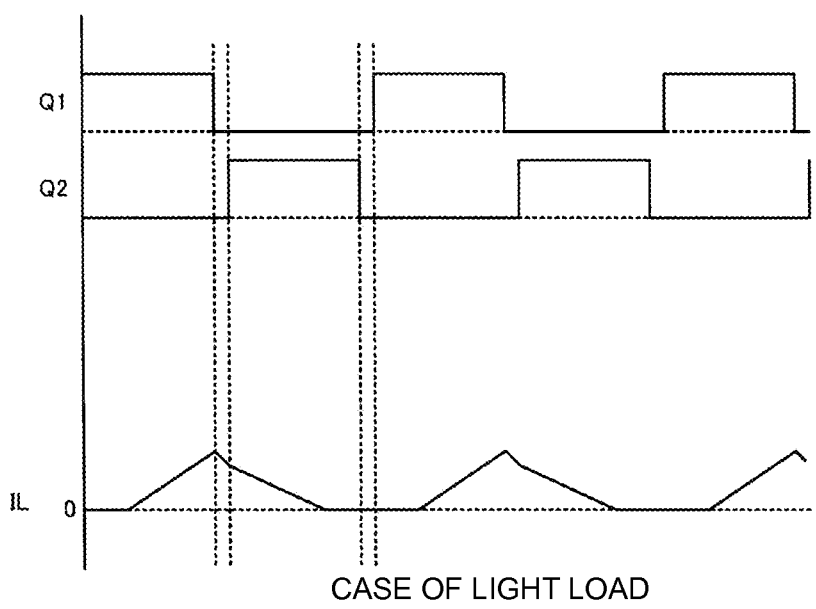
CASE OF LIGHT LOAD FIG. 3
PRIOR ART
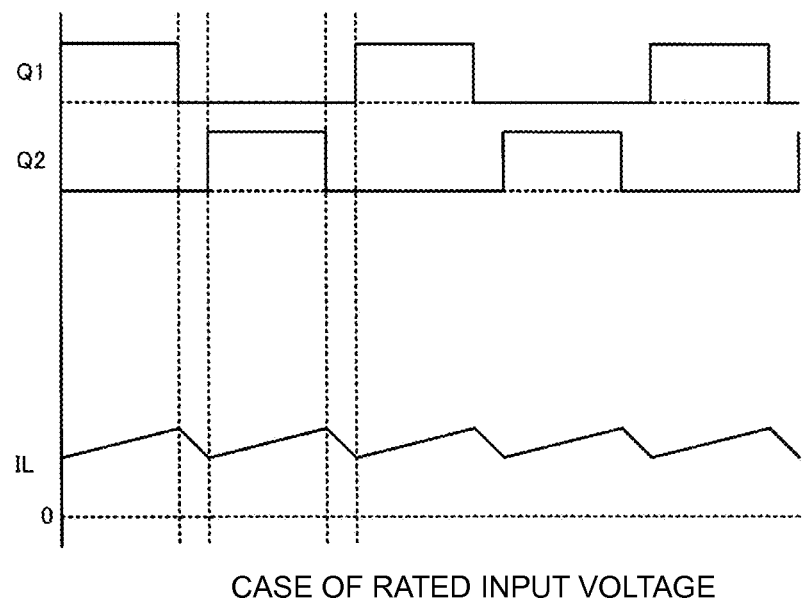
CASE OF RATED INPUT VOLTAGE
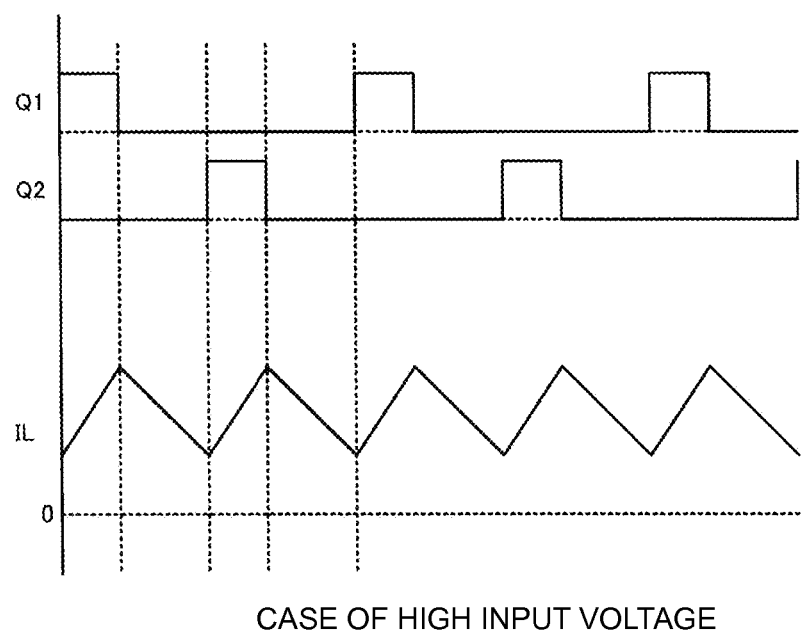
CASE OF HIGH INPUT VOLTAGE

FIG. 4
PRIOR ART
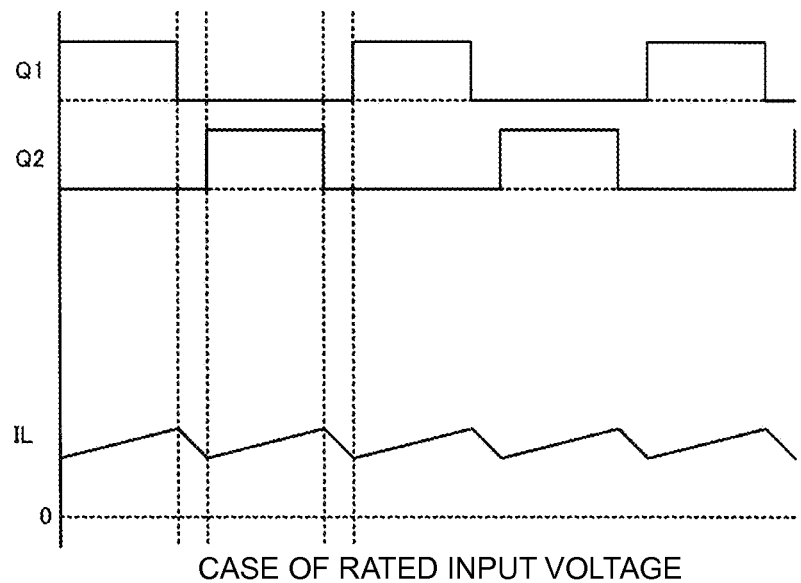
CASE OF RATED INPUT VOLTAGE
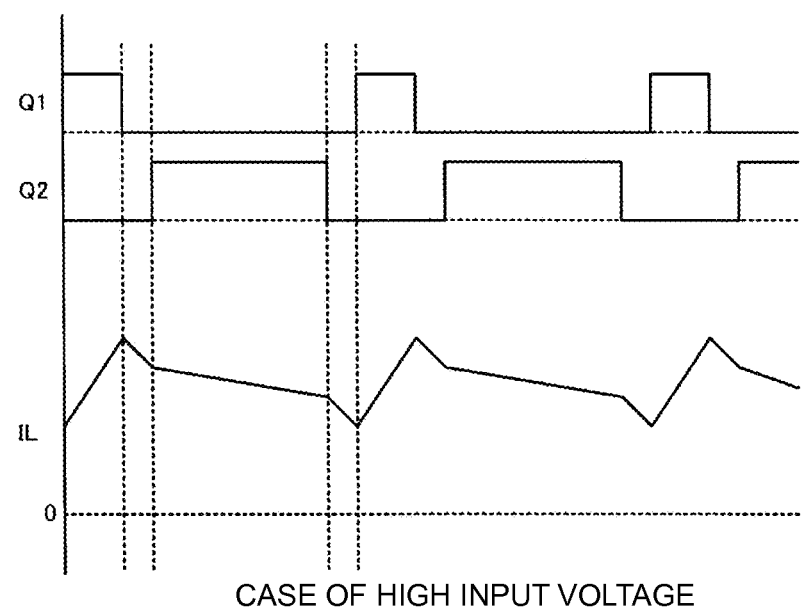
CASE OF HIGH INPUT VOLTAGE FIG. 8
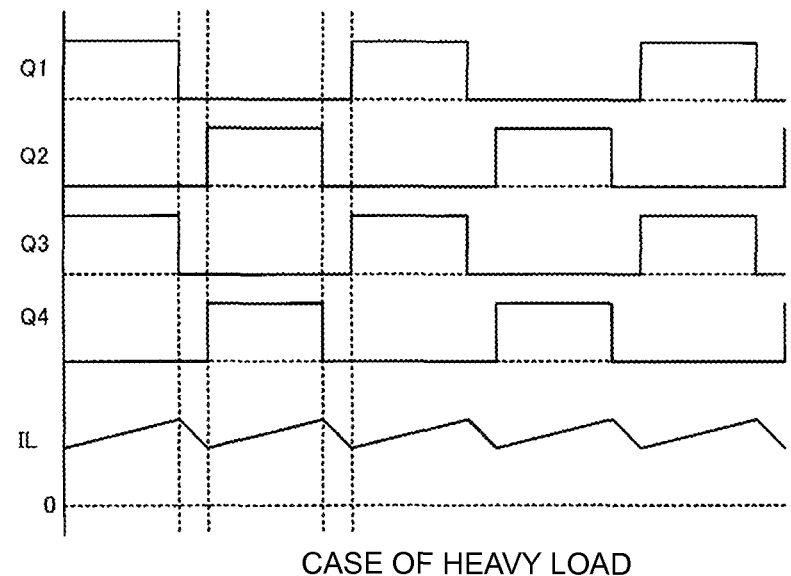
CASE OF HEAVY LOAD
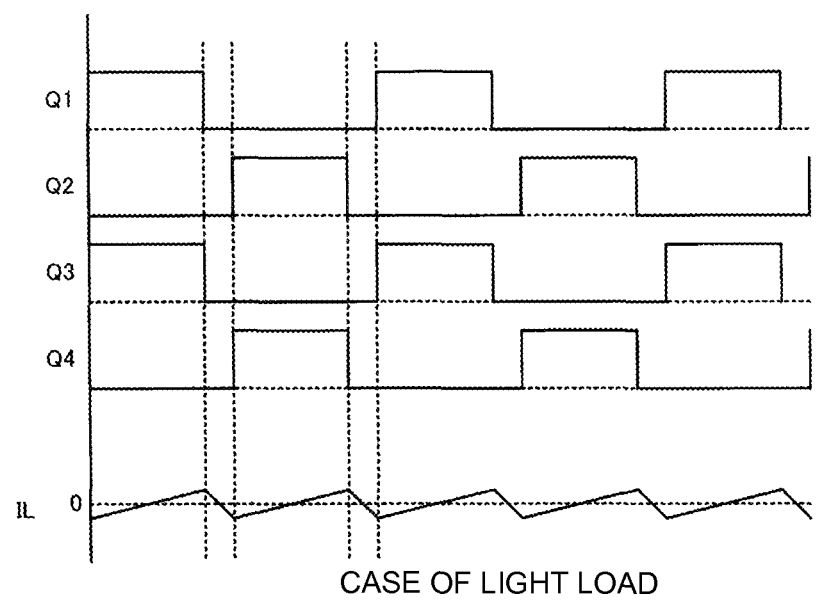
CASE OF LIGHT LOAD

FIG. 17
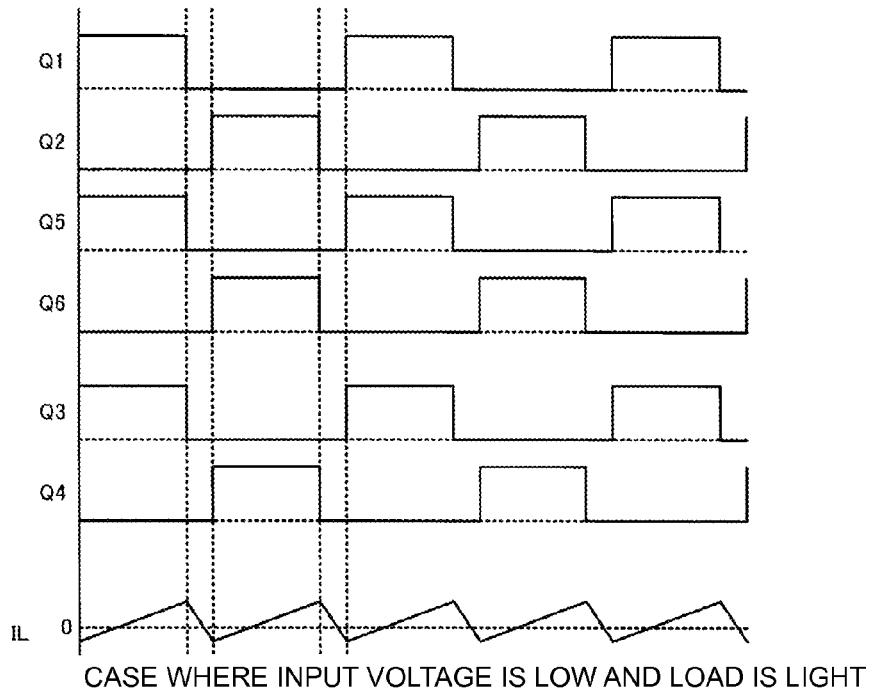
CASE WHERE INPUT VOLTAGE IS LOW AND LOAD IS LIGHT
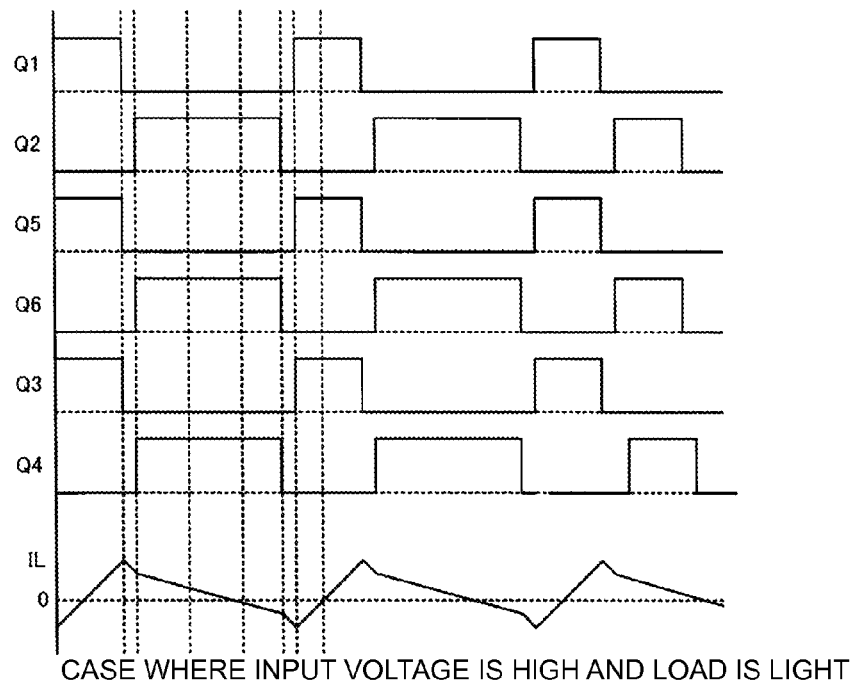
CASE WHERE INPUT VOLTAGE IS HIGH AND LOAD IS LIGHT

CASE OF LIGHT LOAD

SWITCHING POWER-SUPPLY APPARATUS INCLUDING SWITCHING ELEMENTS HAVING A LOW THRESHOLD VOLTAGE

BACKGROUND OF THE INVENTION

1. Field of the Invention

The present invention relates to techniques of improving, over a wide range of load variations from light loads to heavy loads, the controllability of switching power-supply apparatuses that include a half-bridge or full-bridge system suitable for use in high-power applications in a primary-side driving circuit without there being substantially any periods during which energy is not transferred between the primary and secondary sides of the transformer.

2. Description of the Related Art

Known examples of switching power-supply apparatuses for high-power applications have included half-bridge and full-bridge converters.

A half-bridge converter is illustrated in FIG. 1. A primary-side power converter circuit includes a series circuit including a first switch circuit S1, which includes a first switching element Q1, a first capacitor C1, and a first diode D1 connected in parallel with one another, and a second switch circuit S2, which includes a second switching element Q2, a second capacitor C2 and a second diode D2 connected in parallel with one another, and a series circuit including a high-voltage-side capacitor C10 and a low-voltage-side capacitor C11, that are connected in parallel with an input power supply Vin. Furthermore, the two ends of a first primary coil Np1 of a transformer T are respectively connected to a connection point between the first switch circuit S1 and the second switch circuit S2 and to a connection point between the high-voltage-side capacitor C10 and the low-voltage-side capacitor C11.

Furthermore, in a secondary-side power converter circuit of the half-bridge converter, the anode of a third diode D3 is connected to an end of a first secondary coil Ns1 of the transformer T, the anode of a fourth diode D4 is connected to an end of a second secondary coil Ns2, the cathode of the third diode D3 and the cathode of the fourth diode D4 are commonly connected to an end of a first inductor L1 and the other end of the inductor L1 is connected to an end of a smoothing capacitor C8 and an end of a load Ro. In addition, the other end of the first secondary coil Ns1 and the other end of the second secondary coil Ns2 are commonly connected to the other end of the smoothing capacitor C8 and the other end of the load Ro.

In such a half-bridge converter, the first switching element Q1 and the second switching element Q2 are driven in a complementary manner such that the duty ratios of the first switching element Q1 and the second switching element Q2 are set so as to be approximately 50% when the input voltage and the output voltage are in a rated condition. Since the first switching element Q1 and the second switching element Q2 are short-circuited if they are both simultaneously in an on state, the elements are complementarily driven before and after a period in which both the elements are in an off state (dead time) and, therefore, in practice, the duty ratios are not exactly 50%. For example, the following two control methods exist for cases where the input voltage rises or the output voltage rises, as described below.

In a first method, control is performed such that the output voltage is reduced by complementarily driving the first switching element Q1 and the second switching element Q2 in a completely symmetrical manner such that the duty ratios of both of the first switching element Q1 and the second switching element Q2 is short and the dead time accordingly is long.

In a second method, control is performed such that the output voltage is reduced by alternately turning on the first switching element Q1 and the second switching element Q2 before and after a predetermined dead time such that the duty ratio of the first switching element Q1 is short and, conversely, the duty ratio of the first switching element Q2 is long.

However, there is a drawback with first method in that the period of time during which the first switching element Q1 and the second switching element Q2 are both off (dead time) changes each time, such that the switching elements cannot be subjected to zero voltage switching (ZVS) driving. Therefore, the second method has been preferred in recent years for switching power-supply apparatuses which require high efficiency.

However, with the second method, there is a problem in that the first switching element Q1 and the second switching element Q2 are alternately turned on before and after a predetermined dead time and, therefore, although zero voltage switching (ZVS) driving is possible, as illustrated in FIG. 5, when the load state is a light load, there is a period of time in which the current flowing through the first inductor L1 becomes 0 A and a control characteristic in which when the duty ratio of the first switching element Q1 drops, the output voltage drops, is reversed and control becomes impossible.

In addition, as described in, for example, Japanese Unexamined Patent Application Publication No. 11-262263, if a boost half bridge (BHB) system is used, although zero voltage switching is achieved and the control characteristics at times of light load can be maintained, there is a problem in that the withstand voltage of a switching element must be approximately twice the input voltage, the on resistance of a switching element having such a high withstand voltage is high, and the switching loss is large.

For example, with switching power-supply apparatuses used in general domestic electronic appliances, such as televisions, a reduction of the standby-time power is often highly desirable and stable control characteristics over a considerably wide range of load variation from a light load state in which there is approximately no load to a heavy load state are required. However, it has not been possible to produce switching power-supply apparatuses that are capable of low loss and a wide load variation range with any of the existing methods.

SUMMARY OF THE INVENTION

To overcome the problems described above, preferred embodiments of the present invention provide a switching power-supply apparatus that includes switching elements having a low threshold voltage and that, as well as providing zero voltage switching, is capable of exhibiting low loss, high efficiency, and high output-voltage stability over a wide range of load variation.

A switching power-supply apparatus according to a preferred embodiment of the present invention includes a direct-current power-supply input unit arranged to input a direct-current input voltage, a transformer including at least a first primary coil, a first secondary coil, and a second secondary coil, a half-bridge primary-side power converter circuit in which a series circuit is connected to both ends of the direct-current power-supply input unit and includes a first switch circuit including a first switching element, a first capacitor, and a first diode connected in parallel with one another, and a second switch circuit including a second switching element, a second capacitor, and a second diode connected in parallel with one another, and in which both ends of a series circuit including at least a first input inductor, the first primary coil, and an input capacitor are connected to both ends of the first switch circuit or the second switch circuit, a secondary-side synchronous rectifier circuit including a third switch circuit arranged to rectify a voltage generated by the first secondary coil and that includes a third switching element, a third capacitor, and a third diode connected in parallel with one another, and a fourth switch circuit arranged to rectify a voltage generated by the second secondary coil and that includes a fourth switching element, a fourth capacitor, and a fourth diode connected in parallel with one another, the secondary-side synchronous rectifier circuit operating due to switching operations of the third switch circuit and the fourth switch circuit being controlled in accordance with complementary switching operations of the first switch circuit and the second switch circuit, a first inductor arranged to smooth currents flowing in the first secondary coil and the second secondary coil, and a smoothing capacitor connected downstream from the first inductor, wherein a load is connected downstream from the smoothing capacitor, the first switch circuit and the second switch circuit are arranged to perform mutually complementary switching operations before and after a predetermined dead time and to control an on time ratio of an on time of the first switching element to an on time of the second switching element, thereby controlling power supplied to the load, and, when the load is a light load, an operation mode is provided in which energy is regenerated from the secondary side to the primary side by causing a negative current to flow in a direction opposite to a rectification direction in at least one of the third switching element and the fourth switching element.

A switching power-supply apparatus according to another preferred embodiment includes a direct-current power-supply input unit arranged to input a direct-current input voltage, a transformer including at least a first primary coil, a first secondary coil, a second primary coil, and a second secondary coil, a half-bridge primary-side power converter circuit including a series circuit that includes a first switch circuit including a first switching element, a first capacitor, and a first diode connected in parallel with one another, and a second switch circuit including a second switching element, a second capacitor, and a second diode connected in parallel with one another, both ends of a series circuit includes at least a first input inductor, the first primary coil, and an input capacitor being connected to both ends of the first switch circuit or the second switch circuit a capacitor connected to both ends of a series circuit including the first switch circuit and the second switch circuit, and the direct-current input voltage being connected to both ends of a series circuit including the first switch circuit and an input capacitor via the second primary coil and a second input inductor, a secondary-side synchronous rectifier circuit including a third switch circuit arranged to rectify a voltage generated by the first secondary coil and that includes a third switching element, a third capacitor, and a third diode connected in parallel with one another, and a fourth switch circuit arranged to rectify a voltage generated by the second secondary coil and including a fourth switching element, a fourth capacitor, and a fourth diode connected in parallel with one another, the secondary-side synchronous rectifier circuit operating due to switching operations of the third switch circuit and the fourth switch circuit being controlled in accordance with complementary switching operations of the first switch circuit and the second switch circuit, a first inductor arranged to smooth currents flowing in the first secondary coil and the second secondary coil, and a smoothing capacitor connected downstream from the first inductor, wherein a load is connected downstream from the smoothing capacitor, the first switch circuit and the second switch circuit are arranged to perform mutually complementary switching operations before and after a predetermined dead time and to control an on time ratio of an on time of the first switching element to an on time of the second switching element, thereby controlling power supplied to the load, and, when the load is a light load, an operation mode is provided in which energy is regenerated from the secondary side to the primary side by causing a negative current to flow in a direction opposite to a rectification direction in at least one of the third switching element and the fourth switching element.

The transformer may preferably include a first transformer, which includes at least the first primary coil and the first secondary coil, and a second transformer, which includes at least the second primary coil and the second secondary coil, for example.

The first input inductor or the second input inductor may preferably be defined by a leakage inductance of the transformer, for example.

The transformer may preferably be included in a center-tap full-wave rectifier circuit in which first ends of the first secondary coil and the second secondary coil are connected to each other, a first end of the third switch circuit is connected to a second end of the first secondary coil, a first end of the fourth switch circuit is connected to a second end of the second secondary coil, and a second end of the third switch circuit and a second end of the fourth switch circuit are connected to each other, for example.

Preferably, the third switch circuit may be arranged so as to rectify a voltage generated in the first secondary coil and may be connected in parallel with the second secondary coil, the fourth switch circuit may be arranged so as to rectify a voltage obtained by adding the respective voltages generated by the first secondary coil and the second secondary coil and may be connected inside a closed loop composed of the second secondary coil and the third switch circuit, for example.

At least one of the first switch circuit, the second switch circuit, the third switch circuit, and the fourth switch circuit may preferably be an electric-field-effect transistor, for example.

A time from turning off of the first switching element until turning on of the second switching element or a time from turning off of the second switching element until turning on of the first switching element may preferably be set so that the first switching element or the second switching element can perform a zero voltage switching operation.

When the load is a light load, complementary switching operations of the first switching circuit and the second switching circuit may preferably be subjected to intermittent oscillation driving, for example.

A fourth capacitor may preferably be used instead of the fourth switch circuit, for example.

Secondary-side leakage flux of the transformer may preferably be used to define the first inductor.

In the transformer, preferably, the first secondary coil may have a magnetic polarity opposite to the magnetic polarity of the second secondary coil, and may have a number of turns less than the number of turns of the second secondary coil, for example.

A turn ratio of the number of turns of the first secondary coil to the number of turns of the second secondary coil may preferably be about 1:2, for example.

In the transformer, the degree of magnetic coupling between the first primary coil and the first secondary coil may preferably be relatively large and the degree of magnetic coupling between the second secondary coil and other coils may preferably be relatively small, for example.

The synchronous rectifier circuit may preferably be a self-driven synchronous rectifier circuit, for example.

Preferably, the transformer may further include a third secondary coil and the synchronous rectifier circuit may be driven based on the voltage generated by the third secondary coil, for example.

Preferably, the transformer may further include a third secondary coil and a fourth secondary coil and, in the synchronous rectifier circuit, the third switch circuit may be driven based on a voltage generated by the third secondary coil and the fourth switch circuit may be driven based on a voltage generated by the fourth secondary coil, for example.

Upstream from the direct-current power-supply input unit, a power factor correction converter may preferably be provided for which a commercial power supply is an input power supply thereof and the direct-current input voltage is an output voltage thereof, for example.

According to various preferred embodiments of the present invention, in order for the switching power-supply apparatus not to operate in a current discontinuous mode when there is a light load, control is performed such that the on time ratio of the on time of the first switching element to the on time of the second switching element is a predetermined value, whereby a control characteristic can be maintained in which the output voltage is substantially controlled by controlling the on time of the first switching element.

Since the operating voltage of the first switching element is reduced to a voltage approximately the same as the input voltage, a semiconductor component having a low withstand voltage can preferably be used as the switching element and since it has a low "on" resistance, switching loss is decreased, cost is decreased, and efficiency is increased.

By subjecting the first switching element and the second switching element to zero voltage switching driving, the switching loss is further reduced and the efficiency is further increased.

A primary-side inductance element, which is provided for zero voltage switching, can preferably be replaced with leakage flux from the transformer, thereby decreasing the number of components and reducing the size of the circuit. Thus, the size of the circuit can be reduced and a highly efficient switching power-supply apparatus can be provided.

A synchronous rectifier circuit is preferably provided, whereby, particularly with a high output power, the rectification loss on the secondary side can be significantly reduced and the efficiency can be significantly increased.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 2 illustrates waveform diagrams for times of a heavy load and a light load in the switching power-supply apparatus of the related art.

FIG. 3 illustrates waveform diagrams for times when the input voltage is rated and for when the input voltage is high (or when the output voltage is high) in control method I.

FIG. 4 illustrates waveform diagrams for when the input voltage is rated and for when the input voltage is high (or when the output voltage is high) in control method II.

FIG. 8 illustrates waveform diagrams for times of a heavy load and a light load in the first preferred embodiment of the present invention.

FIG. 17 illustrates waveform diagrams for the gate voltages of first to fourth switching elements and for the current flowing through a first inductor in the switching power-supply apparatus according the sixth preferred embodiment of the present invention.

DETAILED DESCRIPTION OF THE PREFERRED EMBODIMENTS

First Preferred Embodiment

Figure 6:
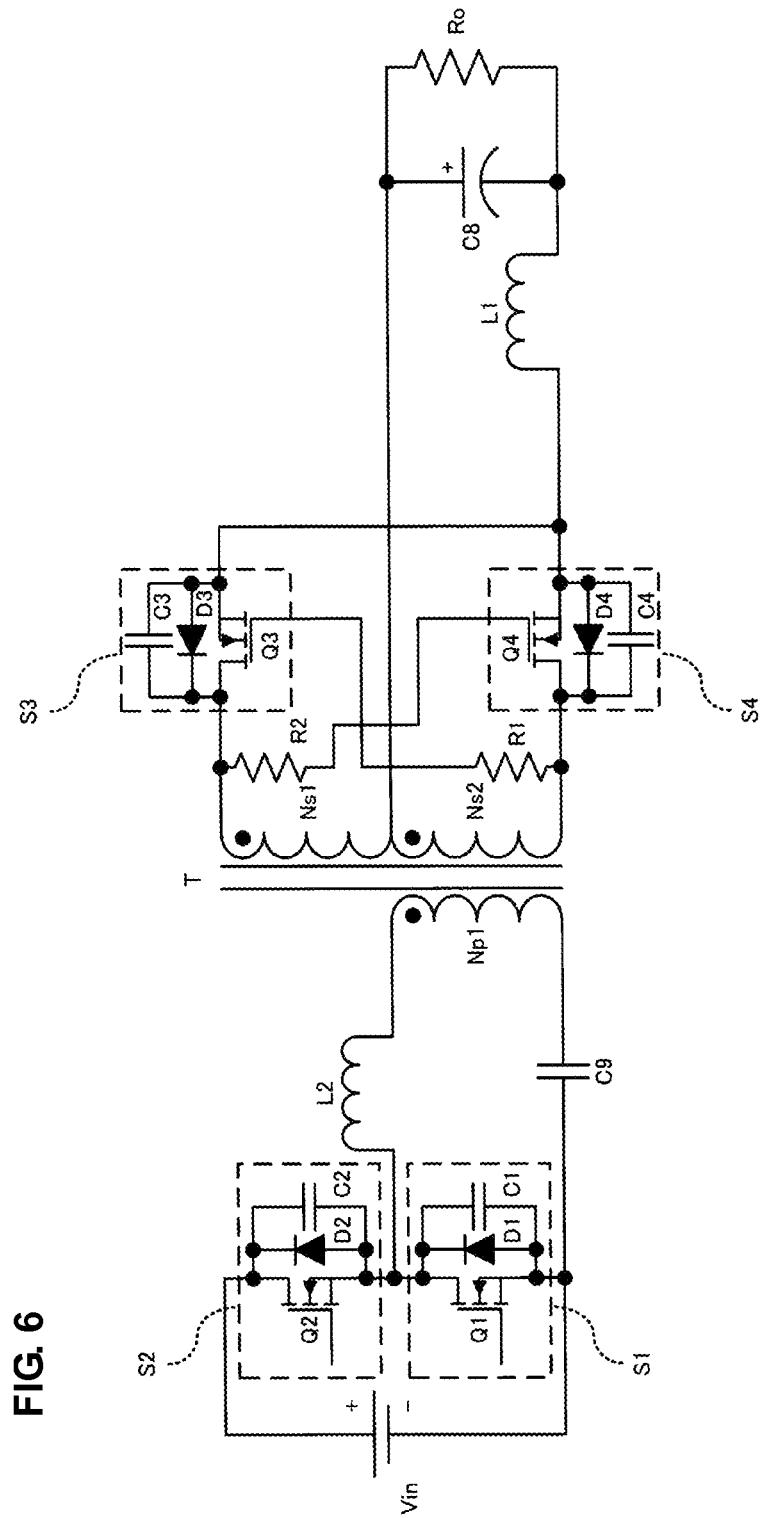
FIG. 6 is a circuit diagram for a switching power-supply apparatus according to a first preferred embodiment of the present invention.

FIG. 6 is a circuit diagram of a switching power-supply apparatus according to a first preferred embodiment of the present invention.

As illustrated in FIG. 6, in a primary-side power converter circuit of the switching power-supply apparatus, a series circuit is connected to an input power supply Vin and preferably includes a first switch circuit S1 including a first switching element Q1, a first capacitor C1, and a first diode D1 connected in parallel with one another, and a second switch circuit S2 including a second switching element Q2, a second capacitor C2, and a second diode D2 connected in parallel with one another. Furthermore, the two ends of another series circuit included therein, which includes a first input inductor L2, a first primary coil Np1 of a transformer T, and an input capacitor C9, are connected to the two ends of the first switch circuit S1.

In addition, in a secondary-side power converter circuit, the drain terminal of a third switch circuit S3, which includes a third switching element S3, a third capacitor C3, and a third diode D3 is connected to an end of a first secondary coil Ns1 of the transformer T, the drain terminal of a fourth switch circuit S4, which includes a fourth switching element Q4, a fourth capacitor C4 and a fourth diode D4, is connected to an end of a second secondary coil Ns2, and the source terminal of the third switch circuit S3 and the source terminal of the fourth switch circuit S4 are commonly connected to an end of a first inductor L1 and the other end of the first inductor L1 is connected to an end of an output capacitor C8 and an end of a load Ro. In addition, the other end of the first secondary coil Ns1 and the other end of the second secondary coil Ns2 are connected to the other end of the output capacitor C8 and the other end of the load Ro. The third switch circuit S3 and the fourth switch circuit S4 define a self-driven synchronous rectifier circuit.

Furthermore, the first switching element Q1 and the second switching element Q2 are preferably configured to be turned on in a mutually complementary manner before and after a predetermined dead time, since a short circuit would occur if both the first switching element Q1 and the second switching element Q2 were on at the same time. The dead time is preferably set for each of the switching elements such that zero voltage switching (ZVS) driving is provided.

In addition, the secondary coils of the transformer T are preferably shunt wound as the first secondary coil Ns1 and the second secondary coil Ns2 and an end of each is connected to an end of the other to define a center tap, and the first secondary coil Ns1 and the second secondary coil Ns2 are preferably wound so as to have the same polarity as each other.

With this configuration, in the transformer T, preferably, the coil polarities of the first primary coil Np1 and the first secondary coil Ns1 are set such that in a period when the first switch circuit S1 is off and the second switch circuit S2 is on, power is transferred from the primary side to the secondary side of the transformer T and the coil polarities of the first primary coil Np1 and the second secondary coil Ns2 are set such that in a period in which the first switch circuit S1 is on and the second switch circuit S2 is off power is transferred from the primary side to the secondary side of the transformer T. Therefore, during a period in which the first switch circuit S1 is on and the second switch circuit S2 is off, the voltage induced in the first secondary coil Ns1 causes the gate potential of the fourth switching element Q4 to be at a low level and the voltage induced in the second secondary coil Ns2 causes the gate potential of the third switching element Q3 to be at a high level. Thus, as a result, the third switch circuit S3 is turned on, an output current flows through the first inductor L1, and thereby a direct-current output voltage is supplied to the load Ro. A resistor R1 is preferably a current-limiting resistor arranged to drive the gate terminal of the third switching element Q3, for example.

Furthermore, during a period in which the first switch circuit S1 is off and the second switch circuit S2 is on, the voltage induced in the first secondary coil Ns1 causes the gate potential of the fourth switching element Q4 to be at a high level and the voltage induced in the second secondary coil Ns2 causes the gate potential of the third switching element Q3 be at a low level. Thus, as a result, the fourth switch circuit S4 is turned on, an output current flows through the first inductor L1, and thereby a direct-current output voltage is supplied to the load Ro. A resistor R2 is preferably a current-limiting resistor arranged to drive the gate terminal of the fourth switching element Q4, for example.

Figure 7:
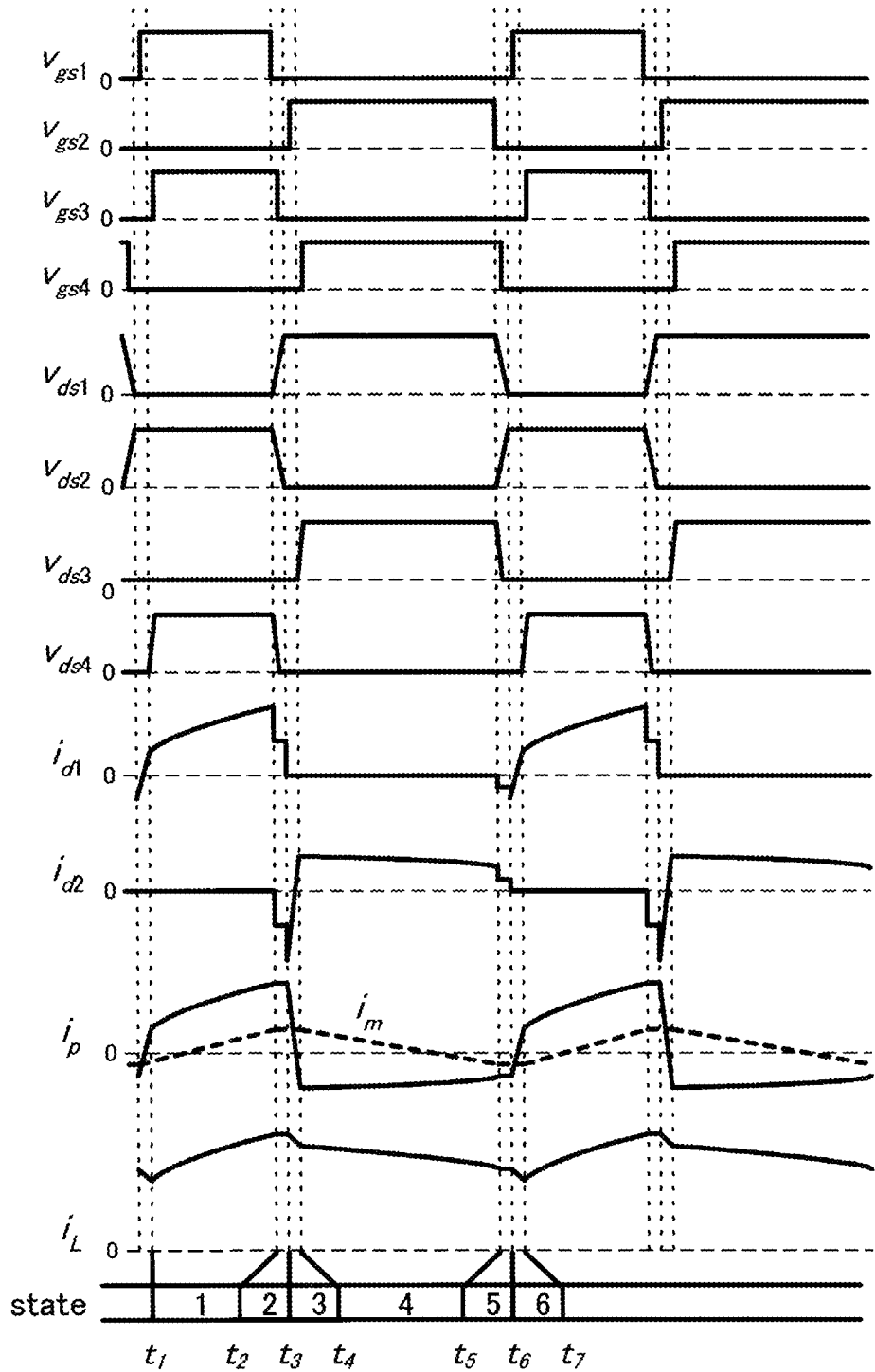
FIG. 7 is a timing diagram for each switching element in the first preferred embodiment of the present invention.

FIG. 7 illustrates waveform diagrams for the individual components of the circuit of the switching power-supply apparatus illustrated in FIG. 6. Hereafter, operations of the circuit will be described with reference to FIG. 6. In FIG. 7, vgs1, vgs2, vgs3, and vgs4 are the gate-source voltages of the switching elements Q1, Q2, Q3 and Q4, respectively. That is, vgs1, vgs2, vgs3, and vgs4 are waveforms illustrating the on and off states of the switching elements Q1, Q2, Q3 and Q4. In addition, vds1, vds2, vds3, and vds4 are the drain-source voltages of the switching elements Q1, Q2, Q3 and Q4, respectively. That is, vds1, vds2, vds3, and vds4 are waveforms illustrating the voltages between the ends of the capacitors C1, C2, C3 and C4. Furthermore, id1, id2, ip and iL are current waveforms of currents flowing through the first switch circuit S1, the second switch circuit S2, the first primary coil Np1, and the first inductor L1, respectively.

Operations in rated operation of the switching power-supply apparatus can be divided into six operation states at times t1 to t7 within a single switching period Ts. Hereafter, operation of the circuit in each of these states will be described.

(1) State 1 [t1 to t2]

First, after the second switching element Q2 has been turned off, when the drain-source voltage Vds1 of the first switching element Q1 becomes approximately zero, the first diode D1 is turned on. At this timing, the first switching element Q1 is turned on, and a zero voltage switching (ZVS) operation is performed.

(2) State 2 [t2 to t3]

The first switching element Q1 is turned on and thereby a current flows in the first primary coil Np1 and the current id1 flowing in the first switching element Q1 and the current ip flowing in the first primary coil Np1 increase as linear or substantially linear functions. At this time, on the secondary side of the transformer T, the voltage induced in the first secondary coil Ns1 causes the gate potential of the fourth switching element Q4 to be at a low level and the voltage induced in the second secondary coil Ns2 causes the gate potential of the third switching element Q3 to be at a high level. Therefore, the third switching element Q3 is turned on and the fourth switching element Q4 is turned off and, as a result, a current only flows in the first secondary coil Ns1. Thus, the current flowing on the secondary side of the transformer T flows in the following order: first inductor L1→third switching element Q3→first secondary coil Ns1→load Ro.

(3) State 3 [t3 to t4]

When the first switching element Q1 is turned off, the first capacitor C1 is charged by energy accumulated in the first input inductor L2 and, accordingly, the drain-source voltage Vds1 of the first switching element Q1 increases. Furthermore, simultaneously, the second capacitor C2 discharges and, accordingly, the drain-source voltage Vds2 of the second switching element Q2 decreases.

(4) State 4 [t4 to t5]

When the drain-source voltage Vds2 of the second switching element Q2 becomes approximately zero, the second diode D2 is turned on. At this timing, the second switching element Q2 is turned on and a zero voltage switching (ZVS) operation is performed.

(5) State 5 [t5 to t6]

The second switching element Q2 is turned on and thereby the first primary coil Np1 is excited in a direction opposite to that at the time of State 2 and the current flowing through the first primary coil Np1 increases as a linear or substantially linear function in a direction opposite to that at the time of State 2. Furthermore, the current id2 flowing through the second switching element Q2 also increases as a linear or substantially linear function. At this time, on the secondary side of the transformer T, the voltage induced in the first secondary coil Ns1 causes the gate potential of the fourth switching element Q4 to be at a high level and the voltage induced in the second secondary coil Ns2 causes the gate potential of the third switching element Q3 to be at a low level. Therefore, the third switching element Q3 is turned off and the fourth switching element Q4 is turned on, and, as a result, a current flows in only the second secondary coil Ns2. Thus, the current flowing on the secondary side of the transformer T flows in the following order: first inductor L1→fourth switching element Q4→second secondary coil Ns2→load Ro.

(6) State 6 [t6 to t7]

When the second switching element Q2 is turned off, the second capacitor C2 is charged by the energy accumulated in the first input inductor L2 and, accordingly, the drain-source voltage Vds2 of the second switching element Q2 increases. Furthermore, simultaneously, the first capacitor C1 discharges and, accordingly, the drain-source voltage Vds1 of the first switching element Q1 decreases. Thereafter, the circuit returns to the operation of State 1.

For the on/off timings of the first switching element Q1 and the second switching element Q2, for example, preferably an output voltage detection circuit is provided to detect the output voltage, and feedback of when a predetermined voltage is exceeded is preferably performed using an isolated feedback unit, such as a photocoupler and on/off control is performed based on the feedback.

Figure 9:
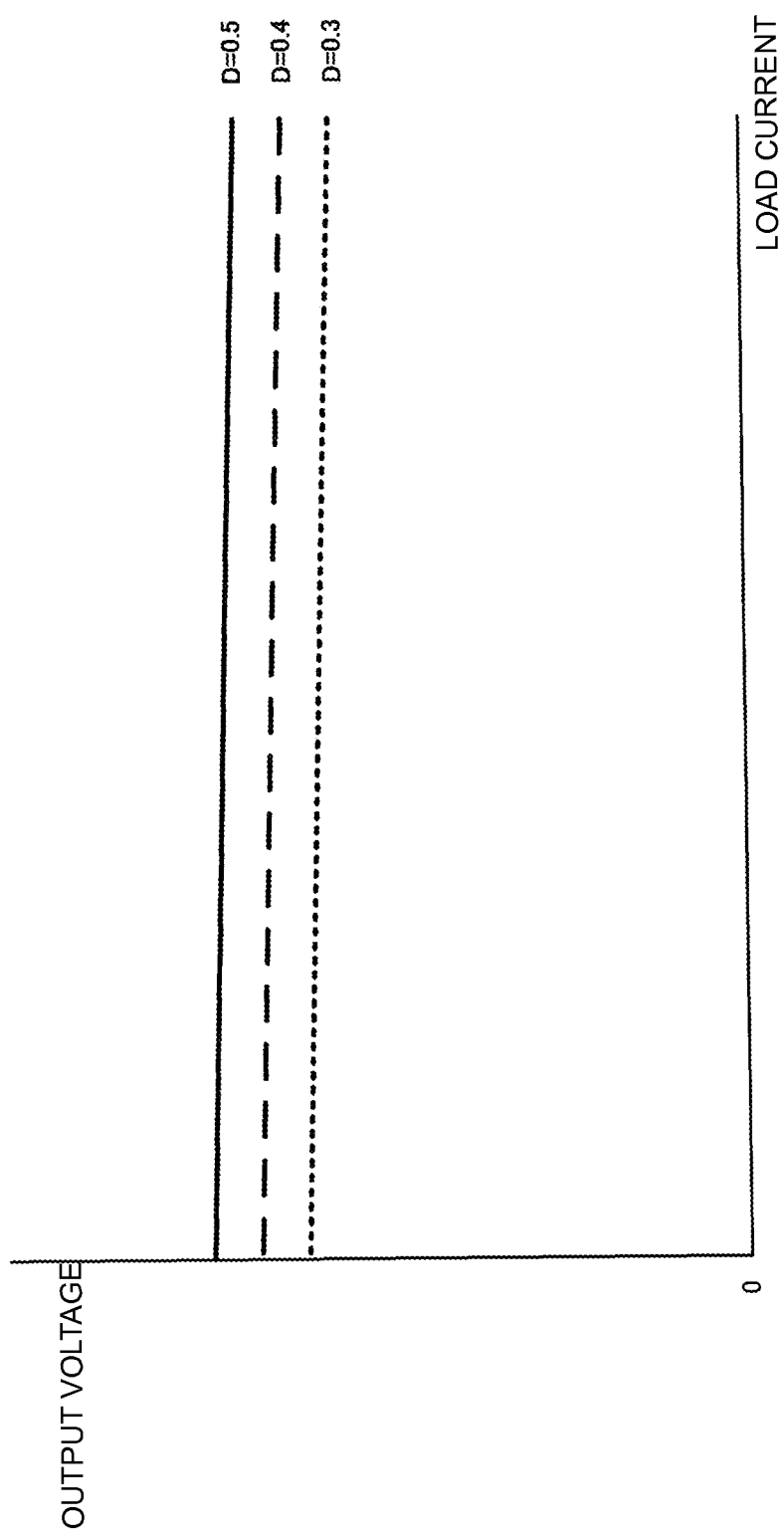
FIG. 9 illustrates load current vs. output voltage characteristics for each duty ratio in the first preferred embodiment of the present invention.

Waveform diagrams for the gate voltages of the first to fourth switching elements Q1 to Q4 and for currents flowing through the first inductor L1 at the time of a heavy load and at the time of a light load are illustrated in FIG. 8. By configuring the secondary-side power converter circuit to be a synchronous rectifier circuit including the third switch circuit S3 and the fourth switch circuit S4, at the time of a light load, a current can be made to flow in a reverse bias direction with respect to the third diode D3 and the fourth diode D4 and therefore the circuit operates, not in a current discontinuous mode, but in an operation mode in which energy is regenerated from the secondary side to the primary side and thereby, as illustrated in FIG. 9, at the time of a light load the output voltage can be controlled by controlling the on time ratio of the first switching element Q1.

In addition, the first to fourth switch circuits S1 to S4 are each preferably defined by a MOSFET, for example, and as a result the diodes D1 to D4 and the capacitors C1 to C4 respectively connected in parallel with the switching elements Q1 to Q4 can be defined by the parasitic diodes and parasitic capacitances included in the respective MOSFETS.

Furthermore, as the on/off control, when the switching frequency is set to be constant or substantially constant and the on time ratio Da (=ton1/ton2) between an on time ton1 of the first switching element Q1 and an on time ton2 of the second switching element Q2 is controlled, since frequency components such as EMI noise generated with the switching operation are centered on a specific frequency, there is an advantage in that counter measures against noise are easily provided.

Second Preferred Embodiment

Figure 10:
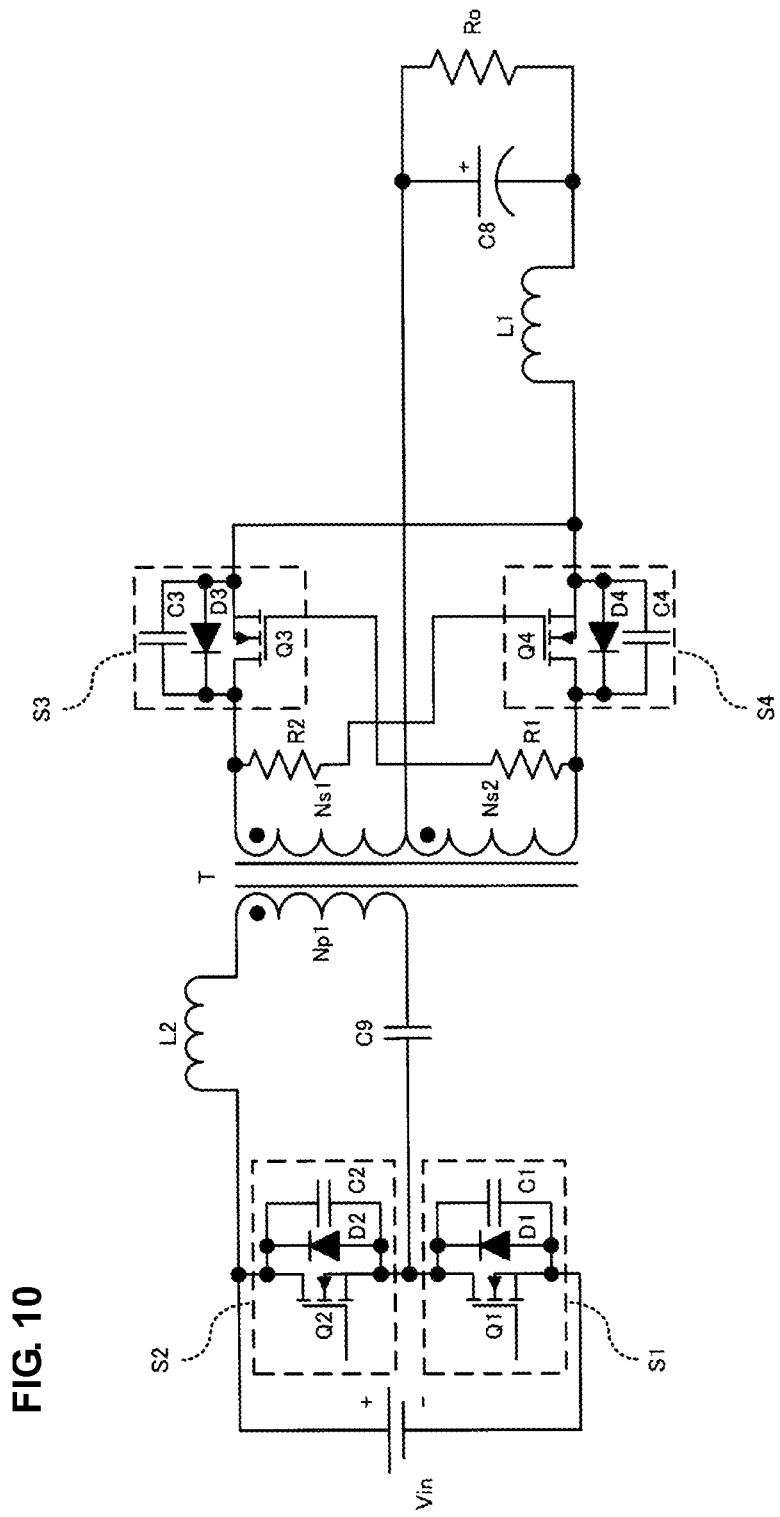
FIG. 10 is a circuit diagram for a switching power-supply apparatus according to a second preferred embodiment of the present invention.

FIG. 10 is a circuit diagram of a switching power-supply apparatus according to a second preferred embodiment of the present invention. The differences from the circuit illustrated in FIG. 6 are that the series circuit including the first input inductor L2, the first primary coil Np1, and the input capacitor C9 is preferably connected to the two ends of the second switch circuit S2, rather than to the first switch circuit S1. The remainder of the configuration preferably is substantially the same as that illustrated in FIG. 6.

With this configuration, the same operational advantages can be achieved as those achieved by the first preferred embodiment of the present invention.

Third Preferred Embodiment

Figure 11:
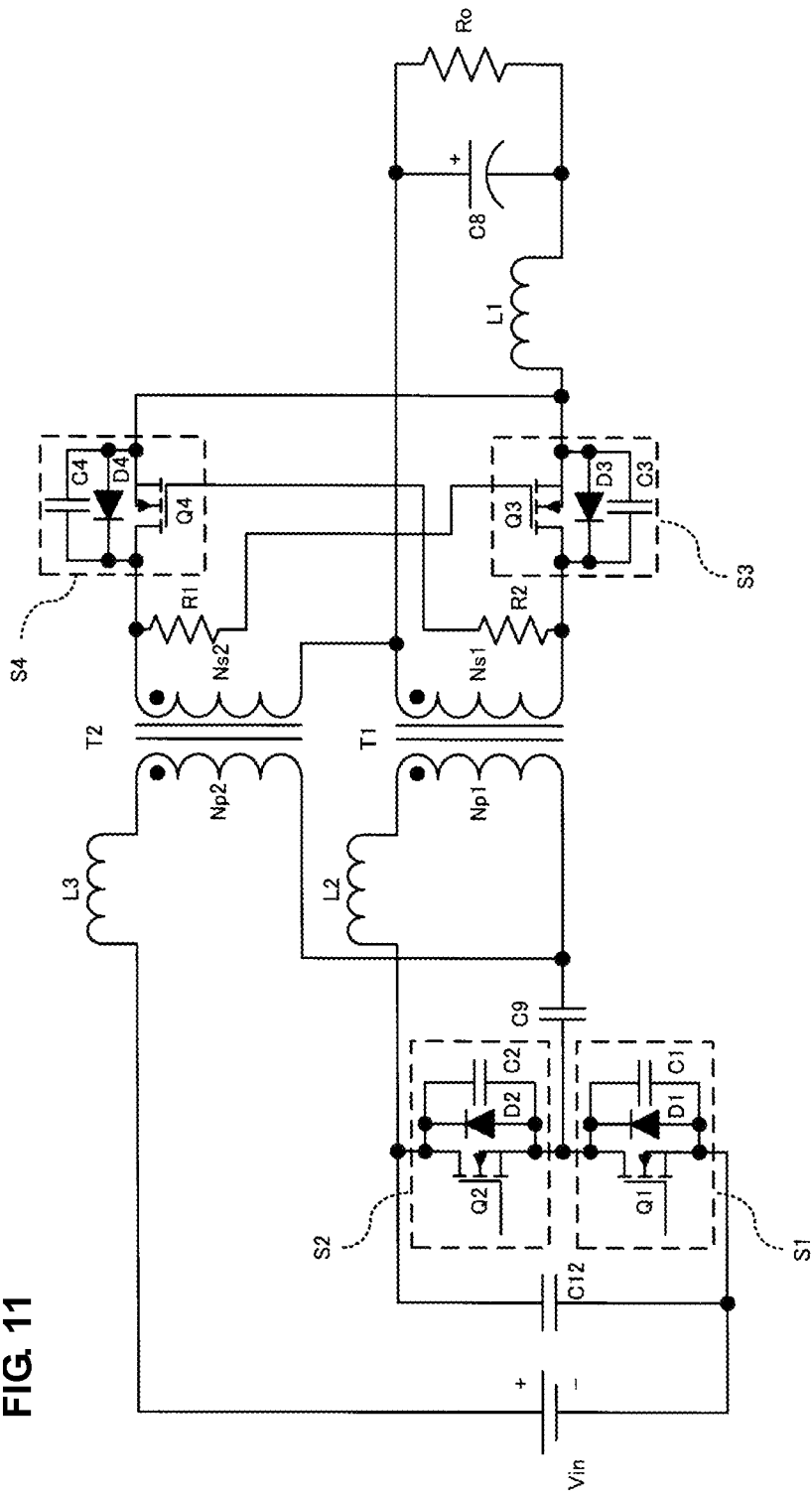
FIG. 11 is a circuit diagram for a switching power-supply apparatus according to a third preferred embodiment of the present invention.

FIG. 11 is a circuit diagram of a switching power-supply apparatus according to a third preferred embodiment of the present invention. The differences from the circuit illustrated in FIG. 6 are that the switching power-supply apparatus is configured such that the transformer T is preferably a two-transformer-type converter that includes a first transformer T1 including the first primary coil Np1 and the first secondary coil Ns1 and a second transformer T2 including a second primary coil Np2 and the second secondary coil Ns2. Furthermore, preferably, a second input inductor L3 is connected in series with the second primary coil Np2, and the two ends of the input power supply Vin are connected to a series circuit including the second input inductor L3, the second primary coil Np2, the input capacitor C9, and the first switch circuit S1, the series circuit including the first input inductor L2, the first primary coil Np1, and the input capacitor C9 is connected in parallel with the two ends of the second switch circuit S2, and an eighth capacitor C12 is connected to the two ends of a series circuit including the first switch circuit S1 and the second switch circuit S2.

In other words, a configuration is provided in which the first primary coil Np1 and the second primary coil Np2 are preferably wound so as to have the same polarity as each other, and when the first switch circuit S1 is on (second switch circuit S2 is off), power is transferred to the secondary side through the second primary coil Np2 and when the second switch circuit S2 is on (first switch circuit S1 is off) power is transferred to the secondary side through the first primary coil Np1.

In the third preferred embodiment, the transformer T is preferably a two-transformer-type converter including the first transformer T1, and the second transformer T2, but the first primary coil Np1, the second primary coil Np2, the first secondary coil Ns1, and the second secondary coil Ns2 may instead be included a single transformer.

With this configuration, the same operational advantages as those of the first preferred embodiment are obtained.

Fourth Preferred Embodiment

Figure 12:
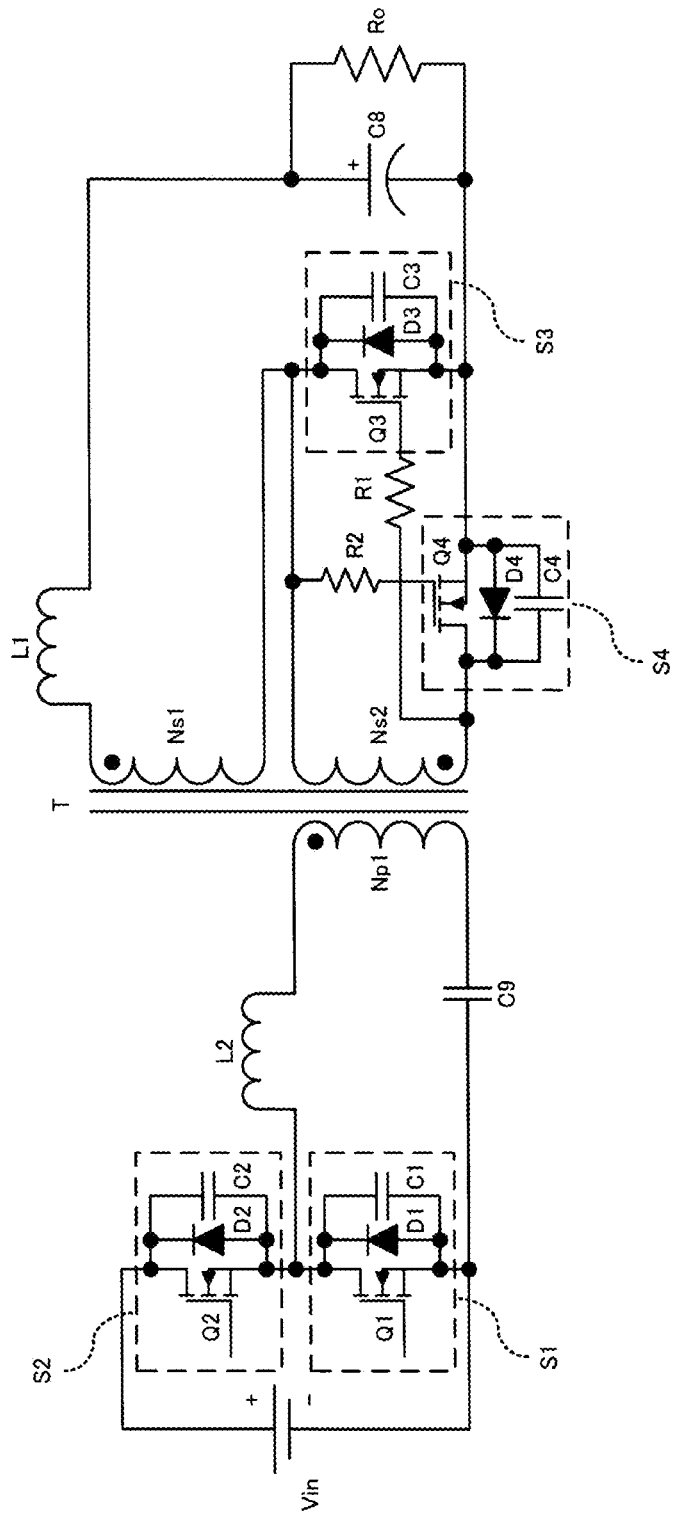
FIG. 12 is a circuit diagram for a switching power-supply apparatus according to a fourth preferred embodiment of the present invention.

FIG. 12 is a circuit diagram of a switching power-supply apparatus according to a fourth preferred embodiment of the present invention. The difference from the circuit illustrated in FIG. 6 is that the first secondary coil Ns1 and the second secondary coil Ns2 of the transformer T preferably define a center-tap-type full-wave rectifier circuit. In FIG. 12, preferably, the drain terminal of the third switch circuit S3 is connected to an end of the second secondary coil Ns2, the drain terminal of the fourth switch circuit S4 is connected to the other end of the second secondary coil Ns2, and the source terminal of the fourth switch circuit S4 is connected to the source terminal of the third switch circuit S3. In addition, an end of the first secondary coil Ns1 is connected to the drain terminal of the third switch circuit S3 and the other end of the first secondary coil Ns1 is connected to an end of the first inductor L1. The other end of the first inductor L1 is connected to an end of the load Ro and the other end of the load Ro is connected to a connection point between the source terminal of the third switch circuit S3 and the source terminal of the fourth switch circuit S4. Furthermore, the smoothing capacitor C8 is connected in parallel with the two ends of the load Ro. With this configuration, for the first primary coil Np1 and the first secondary coil Ns1 of the transformer T, during a period in which the first switching element Q1 is on and the second switching element Q2 is off, due to the voltage induced in the second secondary coil Ns2, the fourth switching element Q4 is turned on, an output current flows through the first inductor L1 and a direct-current output voltage is supplied to the load Ro. Furthermore, during a period in which the first switching element Q1 is off and the second switching element Q2 is on, due to the voltage induced in the second secondary coil Ns2, the third switching element Q3 is turned on, an output current flows through the first inductor L1, and a direct-current output voltage is supplied to the load Ro.

Figure 13:
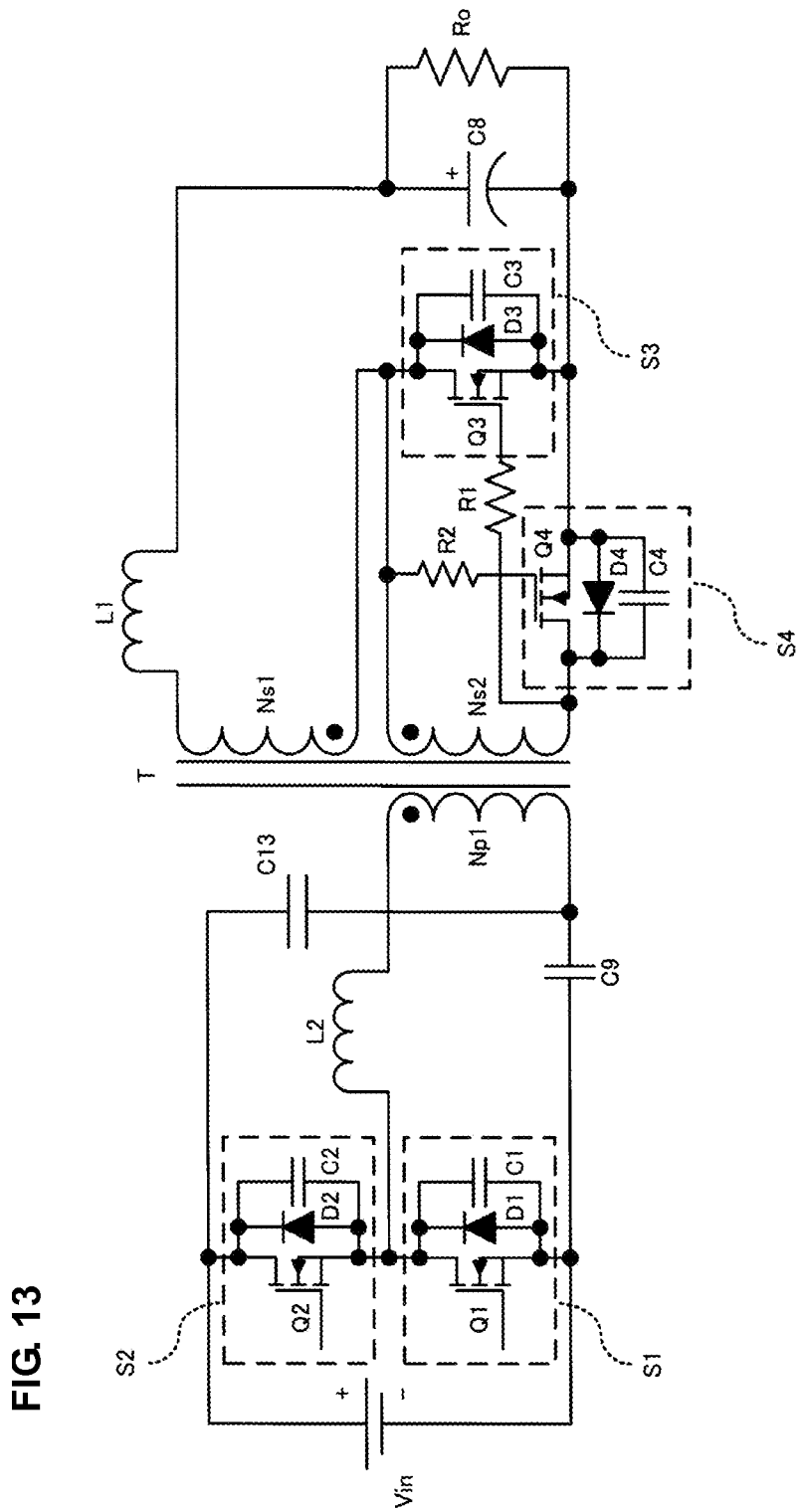
FIG. 13 is a circuit diagram for another switching power-supply apparatus according to the fourth preferred embodiment of the present invention.

In addition, as illustrated in FIG. 13, even if the polarity of the first primary coil Np1, which is the same as that of the first secondary coil Ns1, is reversed such that the polarity of the first primary coil Np1 is the same as that of the second secondary coil Ns2, the circuit will operate in the same manner.

Furthermore, in the transformer T, if the voltage induced in the first secondary coil Ns1 is denoted by Vo1, the voltage induced in the second secondary coil Ns2 is denoted by Vo2, and the voltage output to the load Ro is denoted by Vo, when the turn ratio between the first secondary coil Ns1 and the second secondary coil Ns2 is Ns1:Ns2=about 1:2, for example, when the first switching element Q1 is on and the second switching element Q2 is off, the output voltage Vo is Vo=Vo2−Vo1=2Vo1−Vo1=Vo1, and when the first switching element Q1 is off and the second switching element Q2 is on, the output voltage Vo is Vo=Vo1 and a ripple component can be eliminated from the output voltage Vo. Furthermore, when Ns1:Ns2=about 1:1, since the intensity of magnetic flux generated in the core of the transformer T when the first switching element Q1 is on and the second switching element Q2 is off and the intensity of magnetic flux generated in the core of the transformer T when the first switching element Q1 is off and the second switching element Q2 is on are substantially equal to each other and it becomes difficult for the core of the transformer to reach maximum magnetic saturation, a degree of flexibility is maintained in the design of the transformer.

Furthermore, in the fourth preferred embodiment, in addition to the advantages described above with respect to the first preferred embodiment, an additional advantage is also obtained in that all of the inductance elements necessary for circuit operation can be substituted with transformer leakage flux by using a leakage flux type transformer with a large leakage inductance, whereby the overall size of the circuit can be significantly reduced.

Fifth Preferred Embodiment

Figure 14:
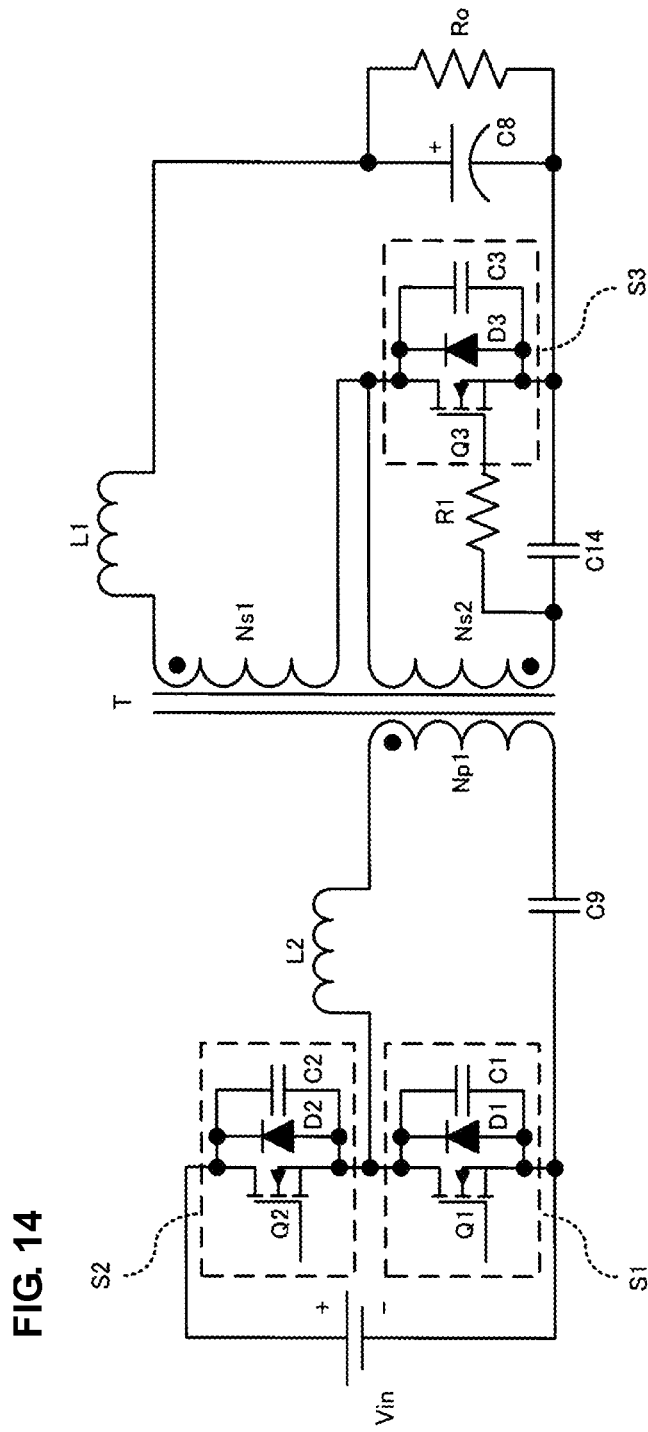
FIG. 14 is a circuit diagram for a switching power-supply apparatus according to a fifth preferred embodiment of the present invention.

FIG. 14 is a circuit diagram of a switching power-supply apparatus according to a fifth preferred embodiment of the present invention. The difference from the circuit illustrated in FIG. 12 is that the fourth switch circuit S4 on the secondary side is preferably replaced with a tenth capacitor C14. In FIG. 12, when the first switching element Q1 is on and the second switching element Q2 is off, the third switching element Q3 is off, and when the first switching element Q1 is off and the second switching element Q2 is on, the third switching element Q3 is on. In contrast, the circuit in FIG. 14 preferably defines a double voltage rectifier circuit and when the first switching element Q1 is on and the second switching element Q2 is off, the tenth capacitor C14 is charged and when the first switching element Q1 is off and the second switching element Q2 is on, twice the voltage is output to the first secondary coil Ns1 as compared to the fourth preferred embodiment illustrated in FIG. 12. The remainder of the configuration is substantially the same as that of the first preferred embodiment and, therefore, description thereof is omitted. The fifth preferred embodiment has an advantage over the first preferred embodiment in that, since there is no fourth switch circuit S4, the cost can be reduced. Furthermore, in the fifth preferred embodiment, particularly in the case of a composite-type transformer T, it is preferable that the turn ratio between the first secondary coil Ns1 and the second secondary coil Ns2 be Ns1:Ns2=about 1:2. In this case, when the voltage induced in the first secondary coil Ns1 is denoted by Vo1, the voltage induced in the second secondary coil Ns2 is denoted by Vo2, and the voltage output to the load Ro is denoted by Vo, when the first switching element Q1 is off and the second switching element Q2 is on, the output voltage Vo is Vo=Vo1, and when the first switching element Q1 is on and the second switching element Q2 is off, since a double voltage rectifier circuit is defined by the tenth capacitor C14 and the third switching element Q3 the output voltage Vo is Vo=Vo2−Vo1=2Vo1−Vo1=Vo1, and a ripple voltage can be removed from the output voltage Vo and the circuit can be configured such that it is difficult for the core of the composite-type transformer T to reach maximum magnetic saturation.

Figure 15:
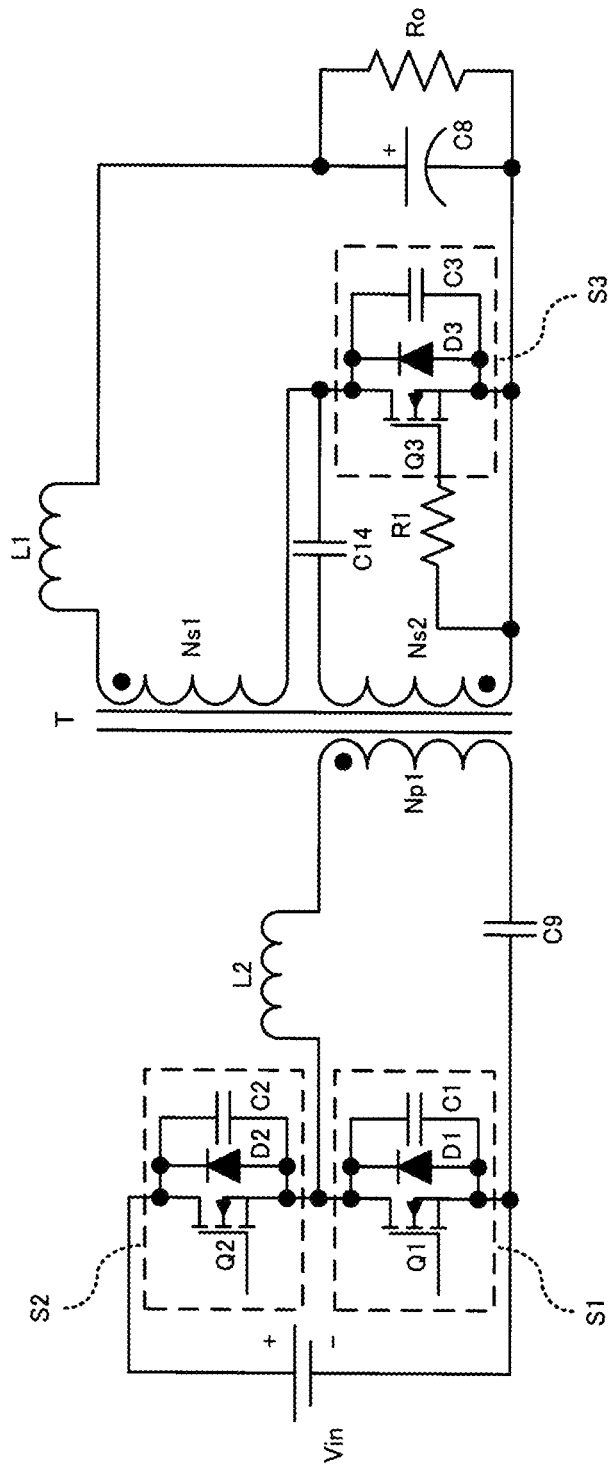
FIG. 15 is a circuit diagram for another switching power-supply apparatus according to the fifth preferred embodiment of the present invention.

In addition, as illustrated in FIG. 15, the tenth capacitor C14 may preferably be connected between the first secondary coil Ns1 and the second secondary coil Ns2, for example.

Furthermore, in the fifth preferred embodiment, in addition to the advantages described above with respect to the first preferred embodiment, the advantage described above with respect to the fourth preferred embodiment is also obtained.

Sixth Preferred Embodiment

Figure 1:
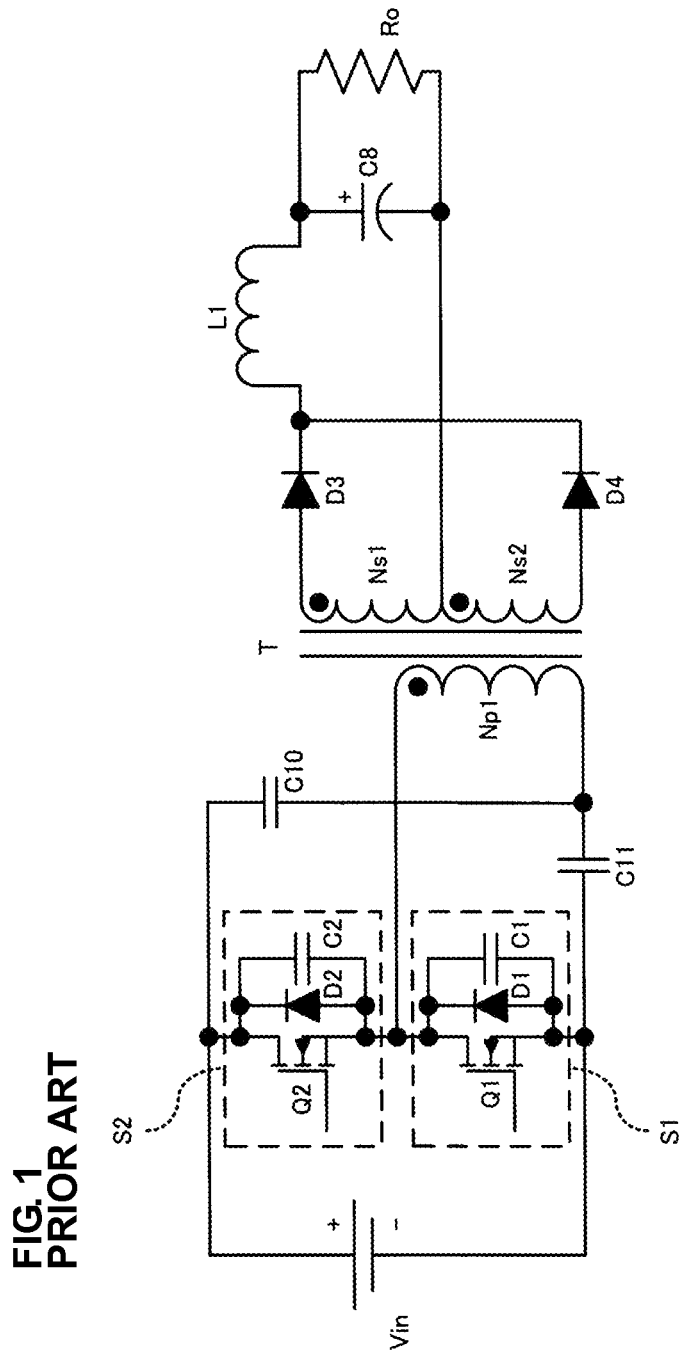
FIG. 1 is a circuit diagram of a switching power-supply apparatus of the related art.
Figure 5:
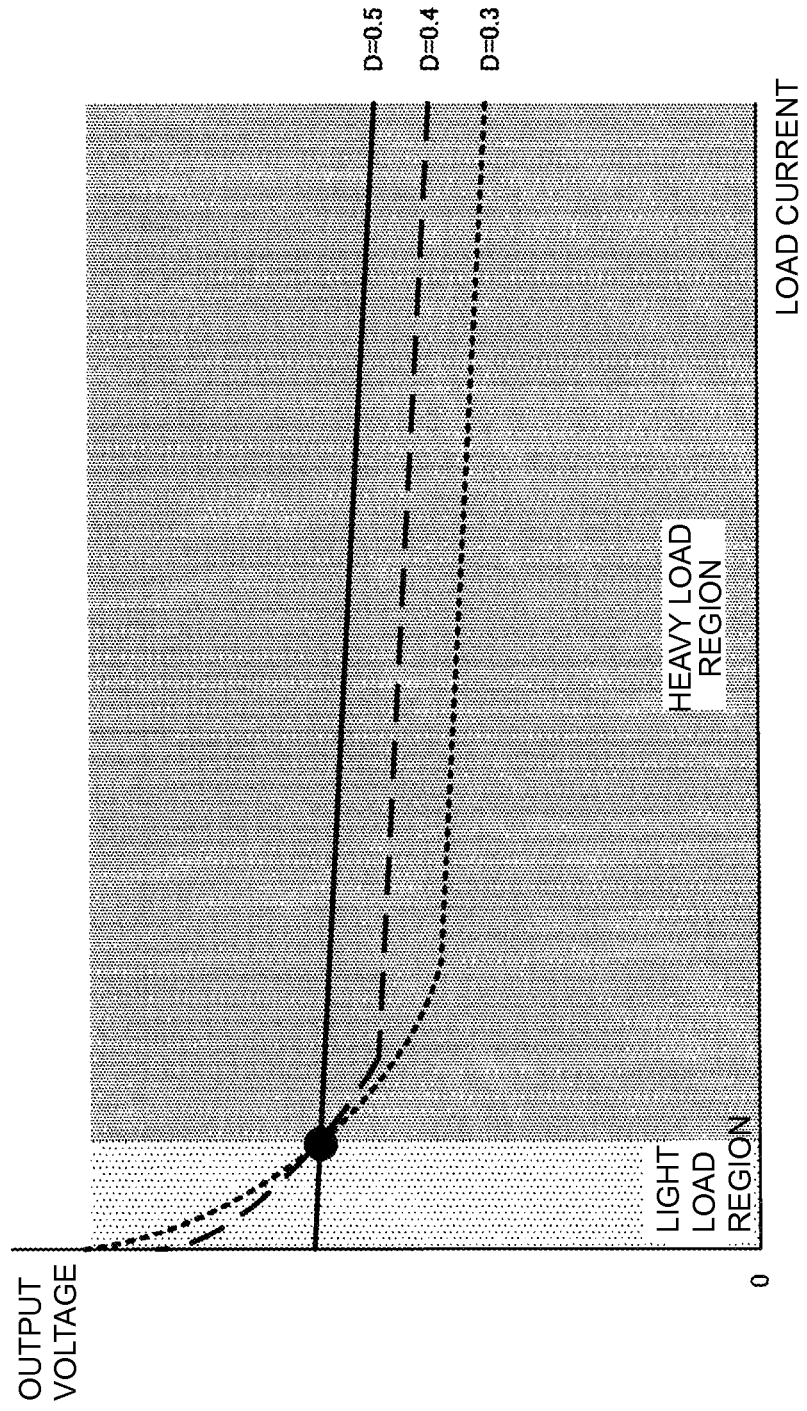
FIG. 5 illustrates load current vs. output voltage characteristics for each duty ratio in control method II.
Figure 16:
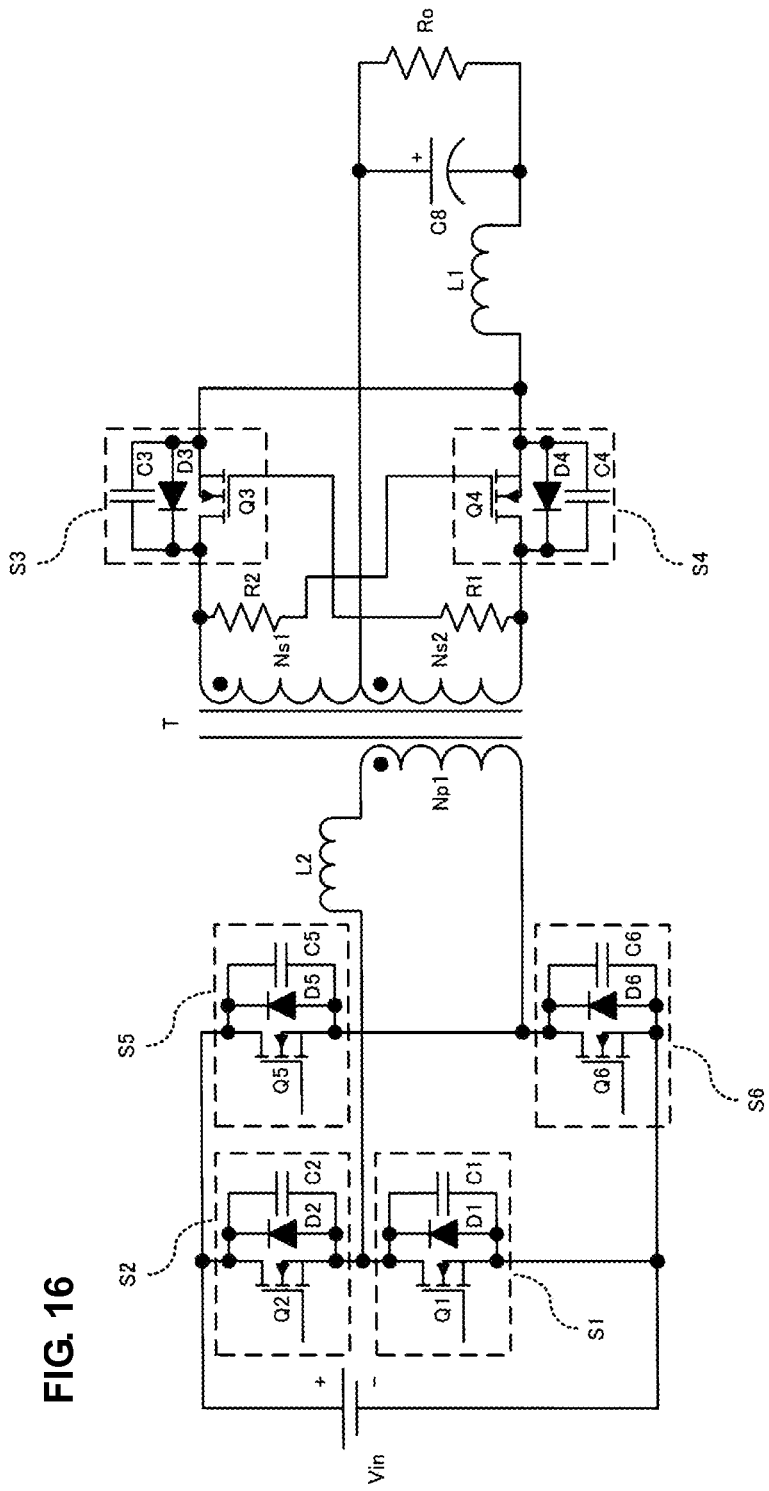
FIG. 16 is a circuit diagram for a switching power-supply apparatus according to a sixth preferred embodiment of the present invention.

FIG. 16 is a circuit diagram of a switching power-supply apparatus according to a sixth preferred embodiment of the present invention. The difference from the circuit illustrated in FIG. 6 is that the primary-side power converter circuit is preferably a full-bridge circuit rather than a half-bridge circuit. In other words, the high-voltage-side capacitor C10 and the low-voltage-side capacitor C11 of FIG. 1 are replaced with a fifth switch circuit S5 including a fifth switching element Q5, a fifth capacitor C5, and a fifth diode D5 connected in parallel with one another, and a sixth switch circuit S6 including a sixth switching element Q6, a sixth capacitor C6 and a sixth diode D6 connected in parallel with one another. The remainder of the configuration is substantially the same as that illustrated in FIG. 6.

FIG. 17 illustrates waveform diagrams for the gate voltages of the first to sixth switching elements Q1 to Q6 and for the current flowing through the first inductor L1 for the circuit illustrated in FIG. 16.

With this configuration, the same operational advantages as in the case of the first preferred embodiment are obtained.

Seventh Preferred Embodiment

Figure 18:
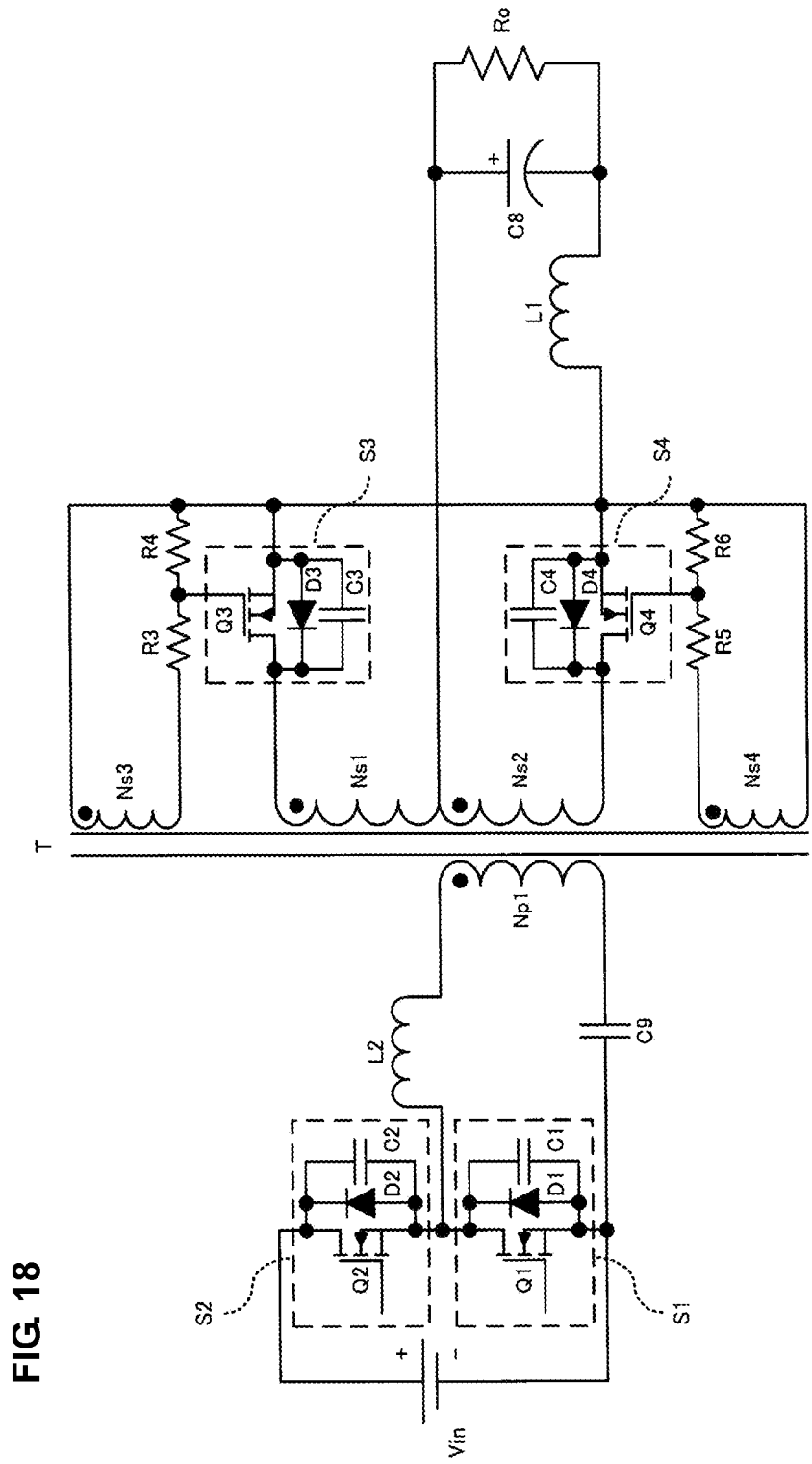
FIG. 18 is a circuit diagram for a switching power-supply apparatus according to a seventh preferred embodiment of the present invention.

FIG. 18 is a circuit diagram of a switching power-supply apparatus according to a seventh preferred embodiment of the present invention. The difference from the circuit illustrated in FIG. 6 is that the transformer T preferably includes a third secondary coil Ns3 and a fourth secondary coil Ns4 and the gate terminals of the third switching element Q3 and the fourth switching element Q4 are respectively driven by voltages generated thereby. In FIG. 18, resistors R3 and R4 are preferably voltage divider resistors arranged to divide the voltage generated in the third secondary coil Ns3 and resistors R5 and R6 are preferably voltage divider resistors arranged to divide the voltage generated in the fourth secondary coil Ns4, for example. When the output voltage supplied to the load Ro is low, since there are cases where the third switching element Q3 and the fourth switching element Q4 cannot be directly driven, this kind of circuit configuration is sometimes provided. The remainder of the configuration preferably is substantially the same as that illustrated in FIG. 6.

With this configuration, the same operational advantages as in the case of the first preferred embodiment are obtained.

Eighth Preferred Embodiment

Figure 19:
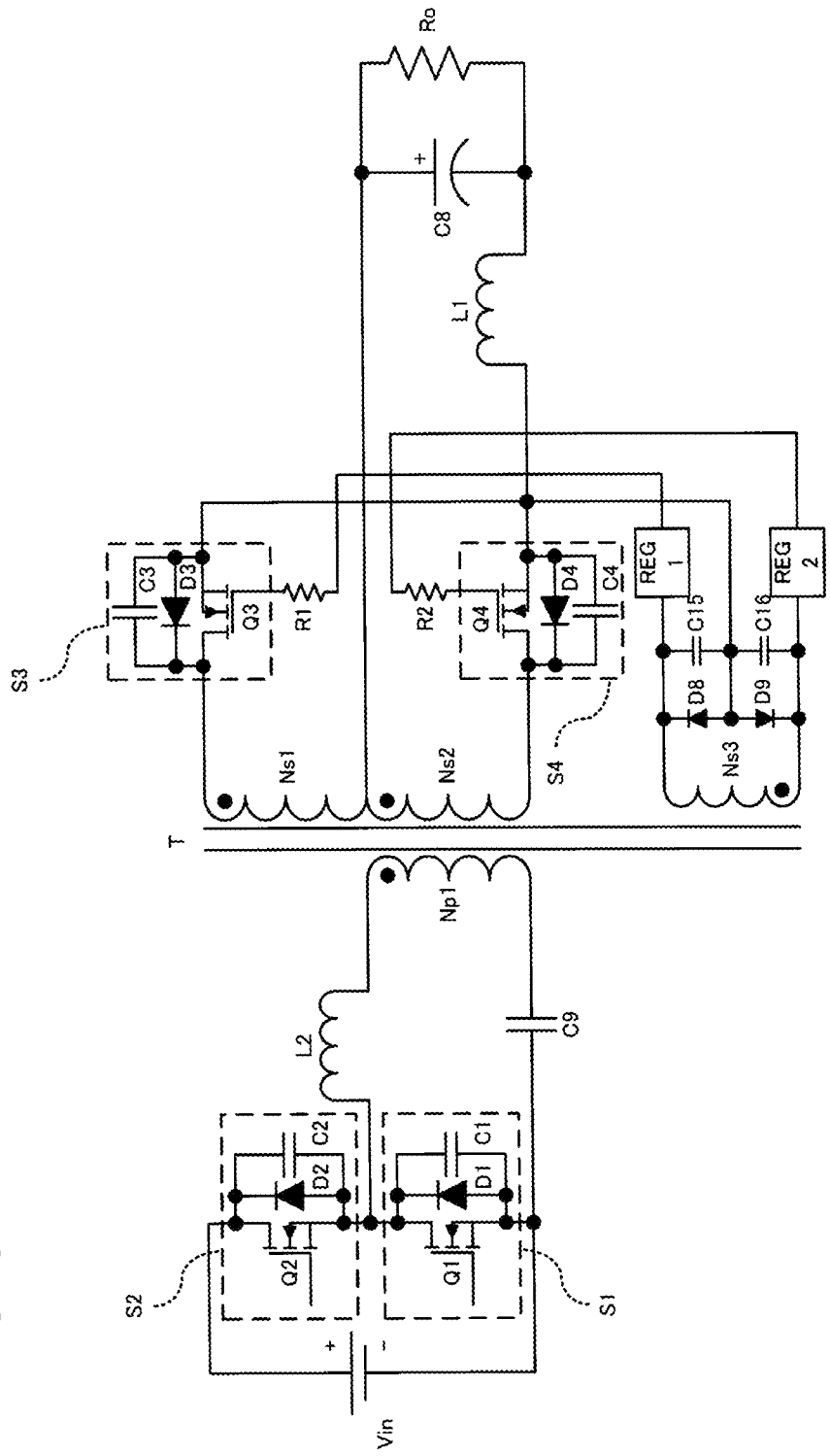
FIG. 19 is a circuit diagram for a switching power-supply apparatus according to an eighth preferred embodiment of the present invention.

FIG. 19 is a circuit diagram of a switching power-supply apparatus according to an eighth preferred embodiment of the present invention. The difference from the circuit illustrated in FIG. 6 is that the transformer T preferably includes the third secondary coil Ns3, and a voltage generated by the third secondary coil Ns3 is rectified and smoothed to define an input voltage of a first regulator REG1 and a second regulator REG2 and voltages obtained from the regulators respectively drive gate terminals of the third switching element Q3 and the fourth switching element Q4. There is one fewer secondary coils as compared to the seventh preferred embodiment and, thus, the size and cost of the transformer T are reduced. The remainder of the configuration is the same as that illustrated in FIG. 6.

With this configuration, the same operational advantages as in the case of the first preferred embodiment are obtained.

Ninth Preferred Embodiment

Figure 20:
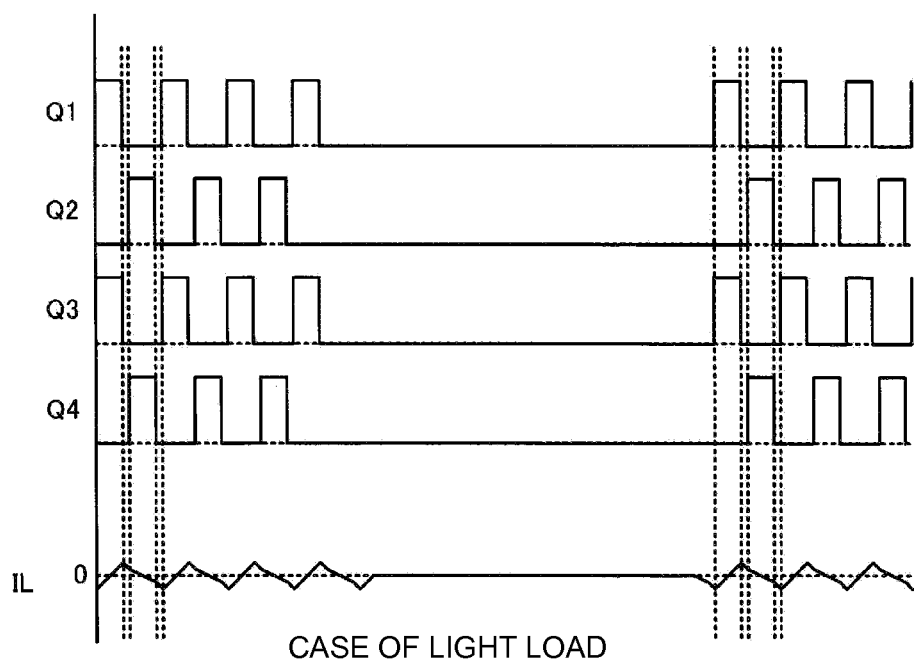
FIG. 20 illustrates waveform diagrams for the gate voltages of first to fourth switching elements and for the current flowing through a first inductor in the switching power-supply apparatus according a ninth preferred embodiment of the present invention.

FIG. 20 illustrates waveform diagrams for the gate voltages of the first to fourth switching elements Q1 to Q4 and for the current flowing through the first inductor L1 in a switching power-supply apparatus according to a ninth preferred embodiment of the present invention. The circuit is substantially the same as that of the first preferred embodiment illustrated in FIG. 6, but this preferred embodiment is different in that at the time of a light load, the first switching element Q1 and the second switching element Q2 are preferably intermittently driven. By intermittently driving the first and second switching elements Q1 and Q2, the number of times regeneration of energy from the secondary side to the primary side is performed at times of a light load is reduced and an increase in efficiency is achieved. The period in which the intermittent operation is performed may preferably be set so as to be sufficiently longer (for example, on the order of about ten times) than the switching period of the first switching element Q1.

Tenth Preferred Embodiment

Figure 21:
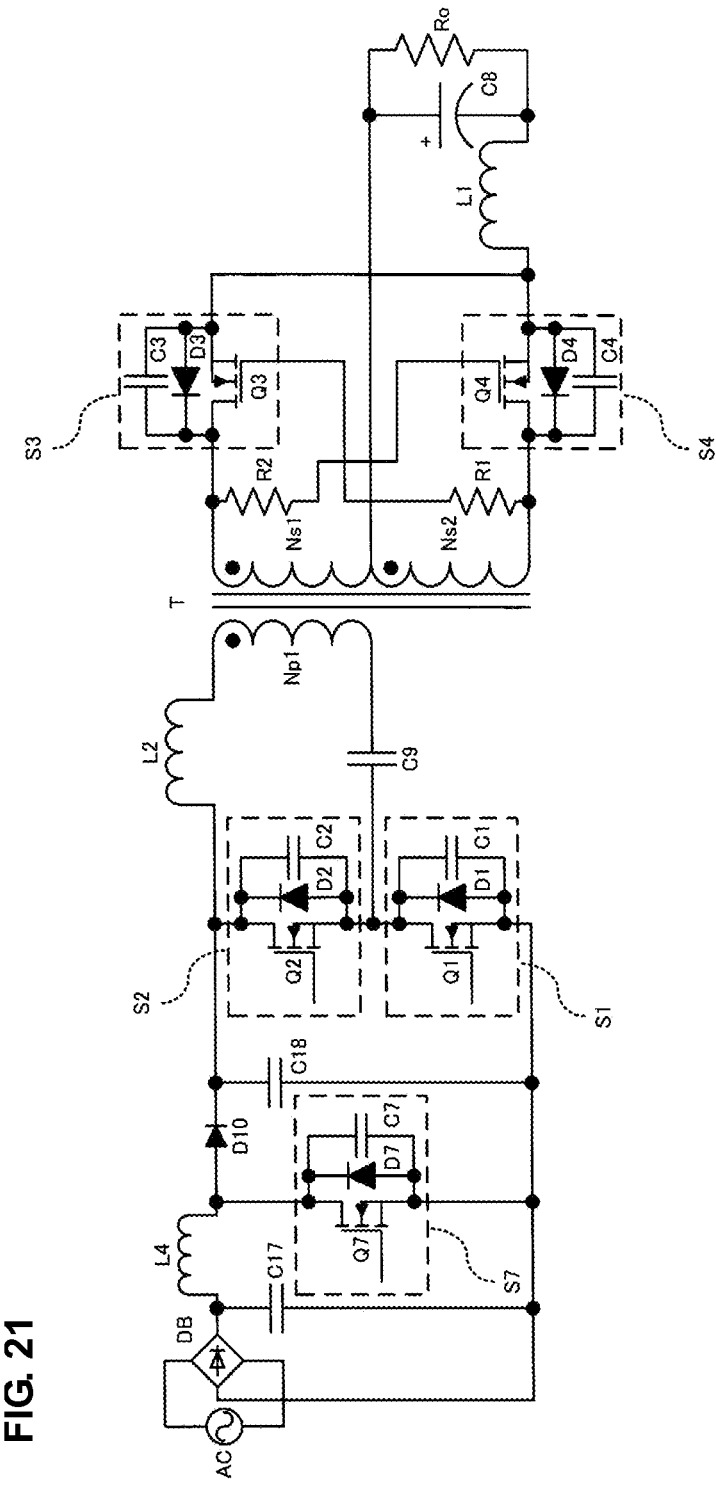
FIG. 21 is a circuit diagram for a switching power-supply apparatus according to a tenth preferred embodiment of the present invention.

FIG. 21 is a circuit diagram of a switching power-supply apparatus according to a tenth preferred embodiment of the present invention. The switching power-supply apparatus preferably includes a power factor correction (PFC) converter that is connected upstream of the circuit illustrated in FIG. 6.

More specifically, the switching power-supply apparatus is preferably configured such that a commercial power supply AC defines an input power supply, a pulsed-current voltage full-wave rectified by a diode-bridge circuit DB is input via a thirteenth capacitor C17 arranged to remove noise to a booster circuit that includes a seventh switch circuit S7 including a second inductor L4, a seventh switching element Q7, a seventh diode D7, and a seventh capacitor C7 connected in parallel with one another, a tenth diode D10 that provides rectification, and a fourteenth capacitor C18 that provides smoothing, and the output voltage therefrom is supplied to the downstream primary-side power converter circuit as the input voltage Vin illustrated in FIG. 6.

In FIG. 6, the input voltage Vin is a direct-current power supply, but when being used as the power-supply apparatus of a consumer appliance, the input power supply is a commercial power supply and is used after being rectified and smoothed. In the half-bridge system described in first preferred embodiment, the first switching element Q1 and the second switching element Q2 operate in a symmetrical manner and, therefore, the respective on time ratios are substantially limited to from about 0 to about 0.5 and there is a problem in that the design margin with respect to variations in the input voltage is narrow. As illustrated in FIG. 21, a commercial power supply defines the input power supply to the subsequent stage and provided that a PFC converter that outputs a predetermined output voltage is connected thereto, there is an advantage in that not only are higher harmonic currents minimized or prevented, which is the primary purpose of a PFC converter, but also the problem experienced by the half-bridge system described above is overcome. With this configuration, the same operational advantages as in the case of the first preferred embodiment are obtained.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A switching power-supply apparatus comprising:
a direct-current power-supply input unit arranged to input a direct-current input voltage;
a transformer including at least a first primary coil, a first secondary coil, and a second secondary coil;
a half-bridge primary-side power converter circuit that includes a first series circuit connected to both ends of the direct-current power-supply input unit and including a first switch circuit that includes a first switching element, a first capacitor, and a first diode connected in parallel with one another, and a second switch circuit that includes a second switching element, a second capacitor, and a second diode connected in parallel with one another, and both ends of a second series circuit including at least a first input inductor, the first primary coil and an input capacitor being connected to both ends of the first switch circuit or the second switch circuit;
a secondary-side synchronous rectifier circuit including a third switch circuit arranged to rectify a voltage generated by the first secondary coil and including a third switching element, a third capacitor, and a third diode connected in parallel with one another, and a fourth switch circuit arranged to rectify a voltage generated by the second secondary coil and including a fourth switching element, a fourth capacitor, and a fourth diode connected in parallel with one another, the secondary-side synchronous rectifier circuit being arranged to operate due to switching operations of the third switch circuit and the fourth switch circuit being controlled in accordance with complementary switching operations of the first switch circuit and the second switch circuit;
a first inductor arranged so as to smooth currents flowing in the first secondary coil and the second secondary coil; and
a smoothing capacitor connected downstream from the first inductor; wherein
a load is connected downstream from the smoothing capacitor;
the first switch circuit and the second switch circuit are arranged to perform mutually complementary switching operations before and after a predetermined dead time and to control an on time ratio of an on time of the first switching element to an on time of the second switching element to control power supplied to the load, regardless of a length of the predetermined dead time;

when the load is a light load, an operation mode is performed in which energy is regenerated from the secondary side to the primary side by causing a negative current to flow in a direction opposite to a rectification direction in at least one of the third switching element and the fourth switching element;
the negative current is provided by the smoothing capacitor;
an output voltage of the switching power supply apparatus is controlled by the negative current when the load is a light load, such that the power supply apparatus does not operate in a current discontinuous mode; and
when the load is a light load, the output voltage is linearly controlled by controlling the on time ratio.

2. The switching power-supply apparatus according to claim 1, wherein the transformer is provided in a center-tap full-wave rectifier circuit in which first ends of the first secondary coil and the second secondary coil are connected to each other, a first end of the third switch circuit is connected to a second end of the first secondary coil, a first end of the fourth switch circuit is connected to a second end of the second secondary coil, and a second end of the third switch circuit and a second end of the fourth switch circuit are connected to each other.

3. The switching power-supply apparatus according to claim 1, wherein the third switch circuit is arranged to rectify a voltage generated in the first secondary coil and is connected in parallel with the second secondary coil, the fourth switch circuit is arranged to rectify a voltage obtained by adding the respective voltages generated by the first secondary coil and the second secondary coil and is connected inside a closed loop defined by the second secondary coil and the third switch circuit.

4. The switching power-supply apparatus according to claim 3, wherein the first inductor is a secondary-side leakage flux of the transformer.

5. The switching power-supply apparatus according to claim 3, wherein, in the transformer, the first secondary coil has a magnetic polarity opposite to a magnetic polarity of the second secondary coil, and includes a number of turns less than a number of turns of the second secondary coil.

6. The switching power-supply apparatus according to claim 5, wherein a turn ratio of the number of turns of the first secondary coil to the number of turns of the second secondary coil is about 1:2.

7. The switching power-supply apparatus according to claim 3, wherein, in the transformer, a degree of magnetic coupling between the first primary coil and the first secondary coil is relatively large and a degree of magnetic coupling between the second secondary coil and other coils is relatively small.

8. The switching power-supply apparatus according to claim 1, wherein a time from turning off of the first switching element until turning on of the second switching element or a time from turning off of the second switching element until turning on of the first switching element is set so that the first switching element or the second switching element performs zero voltage switching operation.

9. The switching power-supply apparatus according to claim 1, wherein, when the load is a light load, complementary switching operations of the first switching circuit and the second switching circuit are subjected to intermittent oscillation driving.

10. The switching power-supply apparatus according to claim 1, wherein the synchronous rectifier circuit is a self-driven synchronous rectifier circuit.

11. The switching power-supply apparatus according to claim 1, wherein the transformer further includes a third secondary coil and the synchronous rectifier circuit is driven based on a voltage generated by the third secondary coil.

12. The switching power-supply apparatus according to claim 1, wherein the transformer further includes a third secondary coil and a fourth secondary coil and, in the synchronous rectifier circuit, the third switch circuit is driven based on a voltage generated by the third secondary coil and the fourth switch circuit is driven based on a voltage generated by the fourth secondary coil.

13. The switching power-supply apparatus according to claim 1, wherein upstream from the direct-current power-supply input unit, a power factor correction converter is provided for which a commercial power supply defines an input power supply thereof and the direct-current input voltage is an output voltage of the power factor correction converter.

14. A switching power-supply apparatus comprising:
a direct-current power-supply input unit arranged to input a direct-current input voltage;
a transformer including at least a first primary coil, a first secondary coil, a second primary coil, and a second secondary coil;
a half-bridge primary-side power converter circuit that includes a series circuit including a first switch circuit that includes a first switching element, a first capacitor, and a first diode connected in parallel with one another, and a second switch circuit that includes a second switching element, a second capacitor, and a second diode connected in parallel with one another, both ends of a second series circuit including at least a first input inductor, the first primary coil, and an input capacitor being connected to both ends of the first switch circuit or the second switch circuit, a capacitor being connected to both ends of a third series circuit including the first switch circuit and the second switch circuit, and the direct-current input voltage being connected to both ends of a fourth series circuit including the first switch circuit and the input capacitor via the second primary coil and a second input inductor;
a secondary-side synchronous rectifier circuit including a third switch circuit arranged to rectify a voltage generated by the first secondary coil and including a third switching element, a third capacitor, and a third diode connected in parallel with one another, and a fourth switch circuit arranged to rectify a voltage generated by the second secondary coil and including a fourth switching element, a fourth capacitor, and a fourth diode connected in parallel with one another, the secondary-side synchronous rectifier circuit being arranged to operate due to switching operations of the third switch circuit and the fourth switch circuit being controlled in accordance with complementary switching operations of the first switch circuit and the second switch circuit;
a first inductor arranged to smooth currents flowing in the first secondary coil and the second secondary coil; and
a smoothing capacitor connected downstream from the first inductor; wherein
a load is connected downstream from the smoothing capacitor;
the first switch circuit and the second switch circuit are arranged to perform mutually complementary switching operations before and after a predetermined dead time and to control an on time ratio of an on time of the first switching element to an on time of the second switching element to control power supplied to the load; and when the load is a light load, an operation mode is provided in which energy is regenerated from the secondary side to the primary side by causing a negative current to flow in a direction opposite to a rectification direction in at least one of the third switching element and the fourth switching element.

15. The switching power-supply apparatus according to claim 14, wherein the transformer includes a first transformer, which includes at least the first primary coil and the first secondary coil, and a second transformer, which includes at least the second primary coil and the second secondary coil.

16. The switching power-supply apparatus according to claim 14, wherein one of the first input inductor and the second input inductor is a leakage inductance of the transformer.

* * * * *